United States Patent
Iwamatsu et al.

(10) Patent No.: US 6,987,814 B2
(45) Date of Patent: Jan. 17, 2006

(54) DISTORTION COMPENSATING DEVICE

(75) Inventors: Takanori Iwamatsu, Kawasaki (JP); Kenzo Kobayashi, Kawasaki (JP); Takayuki Ozaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/177,075

(22) Filed: Jun. 20, 2002

(65) Prior Publication Data

US 2003/0112891 A1 Jun. 19, 2003

Related U.S. Application Data

(62) Division of application No. 09/784,491, filed on Feb. 15, 2001, now Pat. No. 6,487,261, which is a division of application No. 08/526,766, filed on Sep. 11, 1995, now Pat. No. 6,201,841.

(30) Foreign Application Priority Data

Dec. 7, 1994 (JP) .............................. 6-303926

(51) Int. Cl.
 *H04L 27/36* (2006.01)

(52) U.S. Cl. ...................... 375/298; 375/221; 375/261; 455/126

(58) Field of Classification Search ................ 375/324, 375/329, 261, 284, 285, 287, 332, 340, 346, 375/221, 295, 298; 329/304; 455/63.1, 70, 455/91, 114.3, 126, 63; 370/207, 249
See application file for complete search history.

(56) References Cited

U.S. PATENT DOCUMENTS

| | | | | |
|---|---|---|---|---|
| 3,944,929 A | * | 3/1976 | Matsuo | 324/76.24 |
| 4,866,395 A | * | 9/1989 | Hostetter | 329/309 |
| 4,901,333 A | * | 2/1990 | Hodgkiss | 375/345 |
| 4,985,900 A | * | 1/1991 | Rhind et al. | 375/226 |
| 5,233,479 A | * | 8/1993 | Nakatsu et al. | 360/29 |
| 5,309,481 A | * | 5/1994 | Viviano et al. | 375/344 |
| 5,363,410 A | * | 11/1994 | Hayashi | 375/308 |
| 5,537,443 A | * | 7/1996 | Yoshino et al. | 375/340 |
| 5,640,417 A | * | 6/1997 | Barabash et al. | 375/222 |
| 5,822,368 A | * | 10/1998 | Wang | 375/229 |
| 5,838,727 A | * | 11/1998 | Lyon et al. | 375/261 |
| 6,438,360 B1 | * | 8/2002 | Alberth et al. | 455/110 |

FOREIGN PATENT DOCUMENTS

| | | |
|---|---|---|
| JP | 57-159148 | 10/1982 |
| JP | 58-105658 | 6/1983 |
| JP | 06-003387 | 1/1994 |

* cited by examiner

*Primary Examiner*—Young T. Tse
(74) *Attorney, Agent, or Firm*—Katten Muchin Zavis Rosenman

(57) ABSTRACT

A distortion compensating device provided in a receiver for compensating distortion which is added to a signal in a transmission path. The signal is generated in a multi-level modulator of a transmitter in which a digital signal is mapped to one of a plurality of specified signal points in a signal space diagram. The device includes a signal-point-position averaging circuit for producing an average signal point for each of a plurality of distributions of received signal points in the signal space diagram. A discrimination circuit in the device discriminates the average signal point closest to a received signal point from other average signal points in the signal space diagram.

9 Claims, 25 Drawing Sheets

DISTORTION COMPENSATING DEVICE

CROSS-REFERENCE TO RELATED APPLICATION

This application is a division of application Ser. No. 09/784,491, filed on Feb. 15, 2001, now U.S. Pat. No. 6,487,261B which is a division of application Ser. No. 08/526.766, filed on Sep. 11, 1995, now U.S. Pat. No. 6,201,841B1.

BACKGROUND OF THE INVENTION

1. Field of the Invention

The present invention generally relates to a distortion compensating device, and more particularly, to a distortion compensating device in a transmitter or a receiver which can compensate for nonlinear distortion, the nonlinear distortion being caused by a digital signal being distorted in the path from modulation with a matting in the transmitter to demodulation in the receiver.

2. Description of the Related Art

In a digital multiple radio communication, linear modulation such as phase-shift-keying (PSK) modulation and quadrature-amplitude modulation (QAM) is desired to be used for an effective use of frequency. In terrestrial radio communication, a 256QAM system is currently in practical use. In digital mobile communication systems in which a nonlinear modulation is applicable for portability of radio equipment, 4PSK modulation and 16QAM are currently used. To obtain good transmission performance by using such linear modulation systems, it is necessary to produce a high-power transmission signal.

However, when the power of the transmission signal is increased in conventional multiple communication equipment using linear modulation, a nonlinear range in a transmitting-linear amplifier is used. As a result, the transmission signal is distorted and the transmission performance is degraded. Maximum transmission power is determined by a tradeoff with the distortion. Therefore, to obtain a superior transmission performance, a high-efficiency and high-power linear amplifier is required.

On the other hand, in the receiver, to improve carrier to noise ratio (C/N) performance, an RF amplifier having a large gain is commonly used in the front end. However, a high-level signal is applied to the RF amplifier, the RF amplifier is saturated and the received signal is distorted. Therefore, even though the high-level signal is received, the received signal needs to be reduced by an attenuator, etc., and, thus, the high C/N obtained with the high level signal is degraded. Such attenuation of the high-level signal is performed because sufficient transmission performance for the system can be obtained even if the high-level signal is slightly attenuated. However, in the future, for large capacity data transmission, a much better transmutation performance is desired.

At present, several methods of compensating the distortion due to the nonlinear characteristics of the transmitting amplifier are proposed. FIG. 1 shows a block diagram of an example of a transmitter having a conventional distortion compensating function. The transmitter comprises a mapping-and-waveform-shaping circuit 10, quadrature modulator 20, a transmission stage 30, and an antenna 40. The transmitter is constructed with a quadrature modulation technique, in which a baseband digital signal is divided into an I-channel signal and a Q-channel signal, and the two signals modulate 90°-phase-shifted carrier signals to produce a modulated signal by combining the two modulated carrier signals. In the quadrature modulation technique, phase and amplitude of the baseband signal is mapped on a quadrature plane referred to a signal space diagram in which the I axis and the Q axis indicate the carrier signal.

In the mapping-and-waveform-shaping circuit 10, the baseband signals which are divided into the I-channel signal and the Q-channel signal are, respectively, converted to signals for being mapped on the signal space diagram constructed with the I axis and the Q axis, and modulating signals are produced through a roll-off filter. In the quadrature modulator 20, carrier signals Lo are respectively modulated by the I-channel and Q-channel signals, and are summed with each other to produce the modulated signal. In the transmission stage 30, the modulated signal is converted to a signal at the RF frequency, and is amplified by the transmitting amplifier to be transmitted through the antenna 40.

FIG. 2 shows a signal space diagram indicating a relationship between the baseband signal and the carrier signal in 16QAM. For example, in 16QAM, to map the I-channel and the Q-channel signals to one of 16 signal points D1 to D16 (hereinafter, referred to as specified signal points) arranged on the quadrature signal space diagram, the I-channel and Q-channel signals are respectively converted to signals, each having 4 levels. In general, by equalizing each intervals between the 4 levels, the 16 signal points are uniformly arranged on the signal space diagram.

In the receiver side, these signal points are discriminated by threshold lines (represented by dashed lines in FIG. 2) drawn among the signal points in the signal space diagram. The conventional threshold lines are drawn at the center between each two signal points taking into account noise which influences each signal point in the same manner. However, by the strong amplification in the transmission stage 30, the uniformly mapped signal points may be distorted, for example, as shown by signal points $X_1$ to $X_4$ in a first quadrant of FIG. 2. In a more specific case, some distorted signal points may fluctuate to another threshold area such as the signal point $X_3$. As a result, the signal point $X_3$ is discriminated to a wrong signal point as an error. To prevent such fault discrimination, there is a conventional mapping method in which opposite characteristics of the distortion characteristics of the amplifier in the transmission stage 30 are previously set with the mapping circuit 10. By using this method, at the output of the amplifier in the transmission stage 30, a signal point arrangement substantially similar to the specified signal point arrangement may be obtained.

FIG. 3 shows a block diagram of another example of a transmitter having a conventional distortion compensating function. The transmitter comprises a mapping-and-waveform-shaping circuit 11, a quadrature modulator 21, a transmission stage 31 and an antenna 41. Each circuit has the same function as that of the circuit in the transmitter shown in FIG. 1. In the transmitter, according to the shape of the baseband signal passed through the roll-off filter, an operational point of the transmitting amplifier in the transmission stage 31 is changed to extend the dynamic range of the transmitting amplifier. Since the carrier signal is modulated by the baseband signal passed through the roll-off filter, the level of the modulated signal is determined by the amplitude of the baseband signal from the roll-off filter. For example, the level of the modulated signal which is modulated by the baseband signal close to the origin in the signal space diagram is low, and the level of the modulated signal which is modulated by the baseband signal at the surrounding signal points is high. A level change of the modulated signal can be known before transmitting the modulated signal because the baseband signal to be transmitted is known. Therefore, by changing the operational point of the transmitting amplifier according to the level of the modulated signal, dynamic range of the amplifier may be increased.

However, the following problems occur in the above-mentioned conventional distortion compensating devices.

In the distortion-compensating device shown in FIG. 1, when the distortion characteristics due to the nonlinearity of the transmitting amplifier in the transmission stage 30 changes, the proper distortion compensation may not be performed with the previously-set opposite characteristics in the mapping-and-waveform-shaping circuit 10. The case where the distortion characteristics of the transmitting amplifier change may be due to a change of the input level applied to the transmitting amplifier, an exchange of the transmitting amplifier, and a temperature increase and aging of the transmitting amplifier. Therefore, the opposite characteristics need to be adapted to such changes. This adaption requires the hardware to be complex. More specifically, to deal with the exchange of the transmitting amplifier, the transmission stage 30 in the RF circuit and the mapping-and-waveform-shaping circuit in the baseband circuit need to be integrated. This may cause complexity of the configuration of the distortion compensating device.

In the distortion compensating device shown in FIG. 3, the waveform-shaping circuit needs to be constructed with a digital signal processing, and an amplifier whose operational point is controllable is required for the transmission stage 31. Therefore, the configuration of the distortion compensating device becomes complex.

Furthermore, in the distortion compensating devices shown in FIGS. 1 and 3, only distortion occurring in the transmitter side is compensated, the distortion occurring in the receiving amplifier in the receiver side cannot be compensated.

SUMMARY OF THE INVENTION

It is an object of this invention to provide a distortion compensating device. The distortion compensating device may compensate signal distortion which occurs in a path from modulation in a transmitter to demodulation in a receiver regardless of characteristics of the transmitting and receiving amplifiers. The distortion compensating device is easily constructed with a digital signal processing technique, and is capable of being integrated to a 1-chip IC. Further, by using the distortion compensating device, it is possible to increase transmission power in the transmitter without attenuating a receiving level in the receiver. Therefore, a high system gain in the path from the transmitter to the receiver may be achieved. This permits the disadvantages described above to be eliminated.

The object described above is achieved by a distortion compensating device in a receiver for compensating distortion which is added to a signal in a transmission path, the signal being generated in a multi-level modulator of a transmitter in which a digital signal is mapped to one of plural specified signal points in a signal space diagram, the device comprising: a signal-point-position averaging circuit for producing an average signal point for each of a plurality of distributions of received signal points in the signal space diagram; and a discrimination circuit for discriminating the average signal point closest to a received signal point from other average signal points in the signal space diagram.

According to the above distortion compensating device, from a plurality of average signal points produced by the signal-point-position averaging circuit in the receiver, the average signal point closest to the received signal point is discriminated. Therefore, when the received signal point deviates due to the nonlinear distortion of the amplifier, a fault decision for the received signal based on the conventional threshold lines may be decreased.

The object described above is also achieved by a distortion compensating device in a receiver for compensating distortion which is added to a signal in a transmission path, the signal being generated in a multi-level modulator of a transmitter in which a digital signal is mapped to one of plural specified signal points in a signal space diagram, the device comprising: a signal-point-position averaging circuit for producing an average signal point for each of a plurality of distributions of received signal points in the signal space diagram; and a discrimination circuit for defining threshold lines in a checkered pattern between the average signal points in the signal space diagram, and for discriminating a received signal point by the threshold lines.

According to the above distortion compensating device, new-threshold lines are defined between the average signal points produced from the signal-point-position averaging circuit. The received signal point is discriminated according to the new threshold lines. Therefore, when the received signal point deviates due to the nonlinear distortion of the amplifier, the fault decision for the received signal based on the conventional threshold lines may be decreased.

The object described above is also achieved by a distortion compensating device in a receiver for compensating distortion which is added to a signal in a transmission path, the signal being generated in a multi-level modulator of a transmitter in which a digital signal is mapped to one of plural specified signal points in a signal space diagram, the device comprising: a signal-point-position averaging circuit for producing an average signal point for each of a plurality of distributions of received signal points in the signal space diagram; and a discrimination circuit for shifting a received signal point by a distance based on a difference between the specified signal point and the corresponding average signal point in an opposite direction of that from the specified signal point and the corresponding average signal point, and for discriminating a shifted received signal point by threshold lines defined by the specified signal points.

According to the above distortion compensating device, the received signal point is shifted by the distance based on the difference between the specified signal point and the corresponding average signal point in the opposite direction of that from the specified signal point and the corresponding average signal point, and the shifted received signal point is discriminated by the conventional threshold lines defined by the specified signal points. Therefore, by shifting the received signal point, the distortion added to the received signal may be compensated.

The object described above is also achieved by a distortion compensating device in a receiver for compensating distortion which is added to a signal in a transmission path, the signal being generated in a multi-level modulator of a transmitter in which a digital signal is mapped to one of plural specified signal points in a signal space diagram, the device comprising: an error-signal generation circuit for generating an error signal indicating a relationship between a corrected received signal point and the corresponding specified signal point in the signal space diagram; an average-error-signal calculating circuit for producing an average error signal by accumulating the latest error signal from the error-signal generation circuit for each received signal supply; a correction circuit for producing the corrected received signal by subtracting the average error signal from a received signal; and a discrimination circuit for discriminating the corrected received signal from the correction circuit.

According to the above distortion compensating device, the received signal point is corrected in the direction of the specified signal point based on an average value of the error signal indicating the relationship between the corrected received signal point and the corresponding specified signal point, and the corrected received signal point is discriminated by the conventional threshold. Therefore, by correcting the received signal point, the distortion added to the received signal may be compensated.

The object described above is also achieved by a distortion compensating device in a receiver for compensating distortion which is added to a signal in a transmission path, the signal being generated in a multi-level-modulator of a transmitter in which a digital signal is mapped to one of plural specified signal points in a signal space diagram, the device comprising: a distortion-compensated signal calculating circuit for producing a distortion-compensated signal S which is calculated by an equation:

$$S = V - \alpha_1 V - \alpha_2 V^2 - \alpha_3 V^3 \ldots,$$

where V is a received signal, and $\alpha_n$ is a given factor.

According to the above distortion compensating device, as shown in the equation, a distortion component is subtracted from the received signal, and the received signal, after the subtraction, is discriminated by the conventional threshold. Therefore, by the above calculation, the distortion added to the received signal may be compensated.

The object described above is also achieved by a distortion compensating device in a receiver for compensating distortion which is added to a signal in a transmission path, the signal being generated in a multi-level modulator of a transmitter in which a digital signal is mapped to one of plural specified signal points in a signal space diagram, the device comprising: a discrimination circuit for discriminating a received signal according to threshold lines partitioning the signal space diagram into discrimination areas, the threshold lines being defined so that outer side discrimination areas can be wider than inner side discrimination areas.

According to the above distortion compensating device, the threshold lines partitioning the signal space diagram into the plurality of discrimination areas are defined so that the outer side discrimination areas can be wider than the inner side discrimination areas, and the received signal is discriminated by the threshold. More specifically, when the received signal level in the receiver is high, the above type threshold is selected. Therefore, when the received signal point deviates due to the nonlinear distortion of the amplifier, the fault decision for the received signal based on the conventional threshold lines may be decreased. Further, since it is possible to increase transmission power without attenuating the received signal level, this enables a system gain to increase.

The object described above is also achieved by a distortion compensating device in a transmitter for compensating distortion which is to be added to a signal in a transmission path, the signal being generated in a multi-level modulator of a transmitter in which a digital signal is mapped to one of plural specified signal points in a signal space diagram, the device comprising: a variable mapping circuit for changing a mapping pattern of the specified signal points according to a level of a received signal in a receiver.

According to the above distortion compensating device, in modulation of the transmitter, the digital signal is mapped to an outer-shifted signal point when the received signal level in the receiver is high. Therefore, when the signal is distorted by nonlinear characteristics due to the high level of the signal, even if the received signal point in the receiver is deviated by the distortion, a possibility of the fault decision may be decreased. Accordingly, since it is possible to increase transmission power without attenuating the received signal level, this enables the system gain to increase.

The above-mentioned distortion-compensating devices are respectively constructed independent of the characteristics of the transmitting amplifier and the receiving amplifier. Therefore, the device may compensate distortion added in the transmission path from the modulation in the transmitter to the demodulation in the receiver.

Other objects and further features of the present invention will be apparent from the following detailed description when read in conjunction with the accompanying drawings.

DESCRIPTION OF THE PREFERRED EMBODIMENTS

Figure 4:
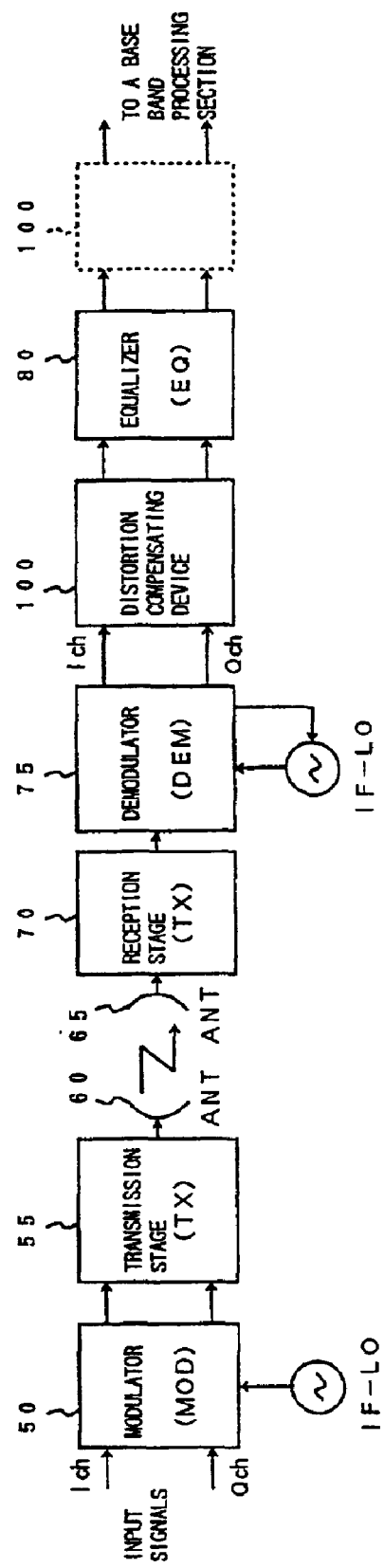
FIG. 4 shows a configuration example of a digital multiple radio communication system including a distortion compensating device according to the present invention.

First, a description will be given of a configuration of a digital multiple radio communication system including a distortion compensating device according to the present invention, by referring to FIG. 4. FIG. 4 shows a configuration example of the digital multiple radio communication system including the distortion compensating device according to the present invention.

Figure 1:
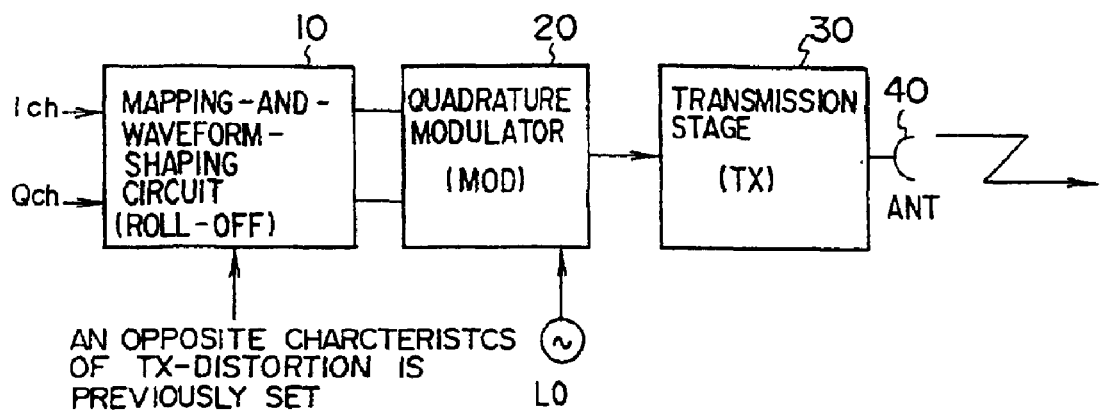
FIG. 1 shows a block diagram of an example of a transmitter having a conventional distortion compensating function.
Figure 2:
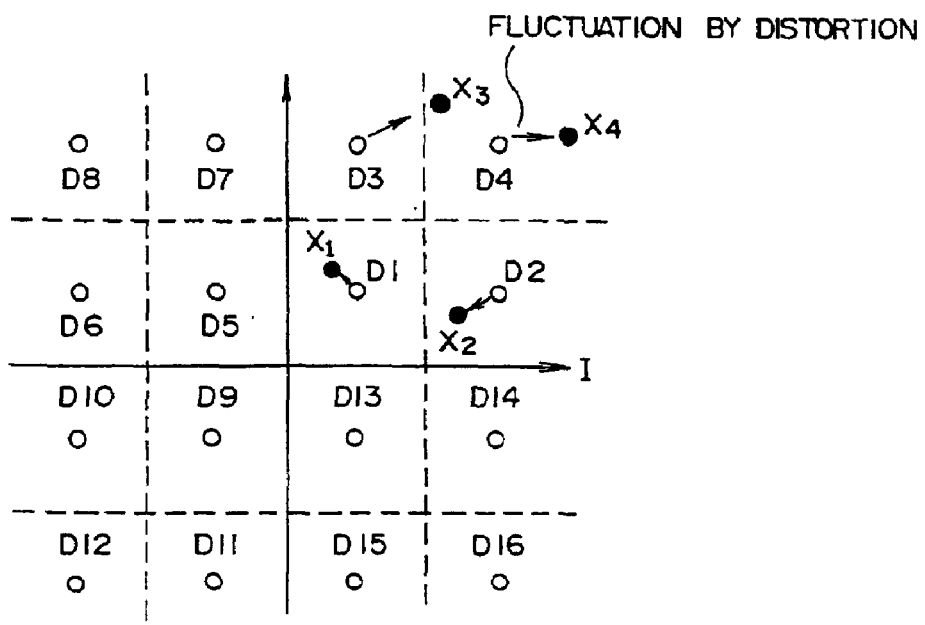
FIG. 2 shows a signal space diagram indicating a relationship between a baseband signal and a carrier signal in 16QAM.
Figure 3:
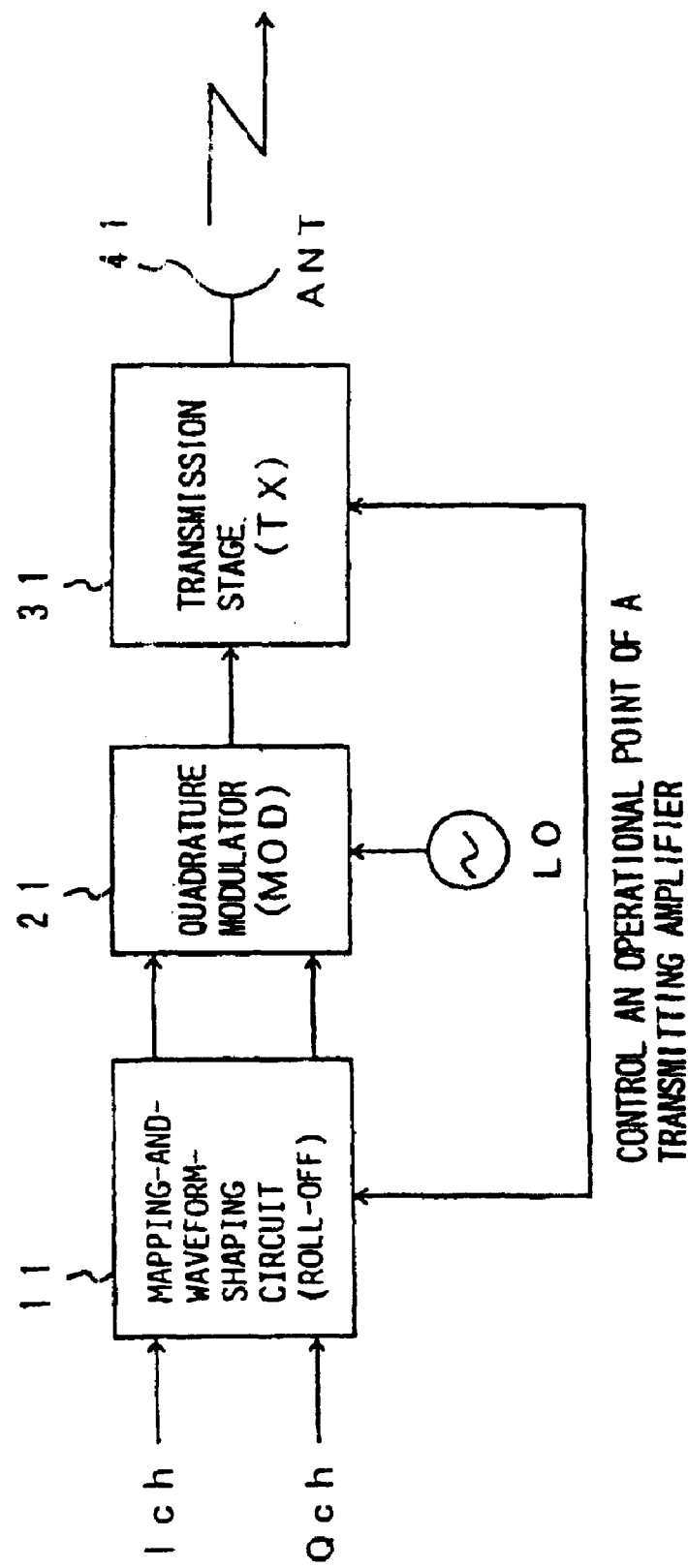
FIG. 3 shows a block diagram of another example of the transmitter having the conventional distortion compensating function.

A transmitter comprises a modulator 50, a transmission stage 55, and an antenna 60. The transmitter also includes the mapping-and-waveform-shaping circuit 10 shown in FIGS. 1 and 3 which is not illustrated in FIG. 4. A receiver comprises an antenna 65, reception stage 70, a demodulator 75, a distortion compensating circuit 100, and an equalizer 80.

In the transmitter, a digital baseband signal is divided into I-channel and Q-channel signals to be quadrature-modulated. After the I-channel and Q-channel signals are respectively converted to signals for being mapped, the signals are applied to the modulator 50 to modulate a carrier signal. The modulated carrier signal is converted up to an RF signal and is amplified by a transmitting amplifier in the transmission stage 55. When the power level of an output signal of the transmitting amplifier is high, the output signal may be distorted. The output signal of the transmitting amplifier is transmitted from the antenna 60, and is received in the reception stage 70 through the antenna 65.

In the reception stage 70, a received signal is amplified with an extremely large gain in a top amplifier, and is converted down to an intermediate-frequency (IF) signal. Since the transmitted signal from the transmitter is extremely attenuated by transmission through space, it is necessary to amplify the received signal to a sufficient level to be analog-processed and digital-processed in the reception stage. In the receiver, by increasing the gain of the top amplifier, a signal to noise ratio of the whole system may be determined by on a noise figure of the top amplifier. However, when the gain in the receiving amplifier is increased as mentioned above, if a high-level signal is received, the receiving amplifier may be saturated, and the received signal may be distorted by the nonlinear characteristics of the receiving amplifier. Further, by a mixer included in the reception stage 70, distortion may occur. Accordingly, when the transmission power in the transmitter is high, the received signal may be influenced by both the distortion in the transmission stage 55 and the distortion in the reception stage 70.

The down-converted IF signal is demodulated in the demodulator 75. In the demodulator 75, a carrier is recovered in synchronization with a carrier of the IF signal, and a coherent detection is carried out by the recovered carrier. However, at this instant of time, a signal decision for discriminating the received signals by comparing with threshold levels is not yet performed. From the demodulator 75, I-channel and Q-channel detected signals are output, which are applied to the distortion compensating circuit 100. In the distortion compensating circuit 100, the distortion of the received signal by the transmission stage 55 and the reception stage 70 may be compensated, and decided signals which have been discriminated by the proper threshold levels are produced. The proper threshold levels are defined by a distortion compensating technique according to the present invention.

Subsequently, the I-channel and Q-channel decided signals are applied to the equalizer 80 constructed with transversal filters. In the equalizer 80, the decided signals are equalized, and are transmitted to a baseband processing circuit (not shown).

In the configuration in FIG. 4, the distortion compensating device 100 can be positioned after the equalizer 80. In this case, after the I-channel and Q-channel signals are equalized, the signals are discriminated by the proper threshold levels which are defined by the distortion compensation technique according to the present invention. Whether the distortion compensation device is located before or after the equalizer 80 is determined by the modulation method, the configuration of the receiver, etc.

As will be appreciated from the foregoing description, the distortion compensating device 100 may compensate the distortion which occurs in the reception stage 70 as well as the distortion which occurs in the transmission stage 55. In this system, since the processing of the distortion compensating is performed in the baseband circuits after the demodulating in the demodulator 75, the integration to the 1-chip IC may be easily achieved. Further, the distortion compensating may be performed regardless of the distortion characteristics of the transmission stage 55 and the reception stage 70. These effects will be described in further detail in the following descriptions of embodiments of the distortion compensating device.

In the following, the descriptions will be given of the embodiments of the distortion compensating device according to the present invention. The following descriptions show cases in which the modulation method of 16QAM is used, but it is noted that other various modulation methods such as 64QAM and QPSK are also usable for the distortion compensating devices according to the present invention.

Figure 5:
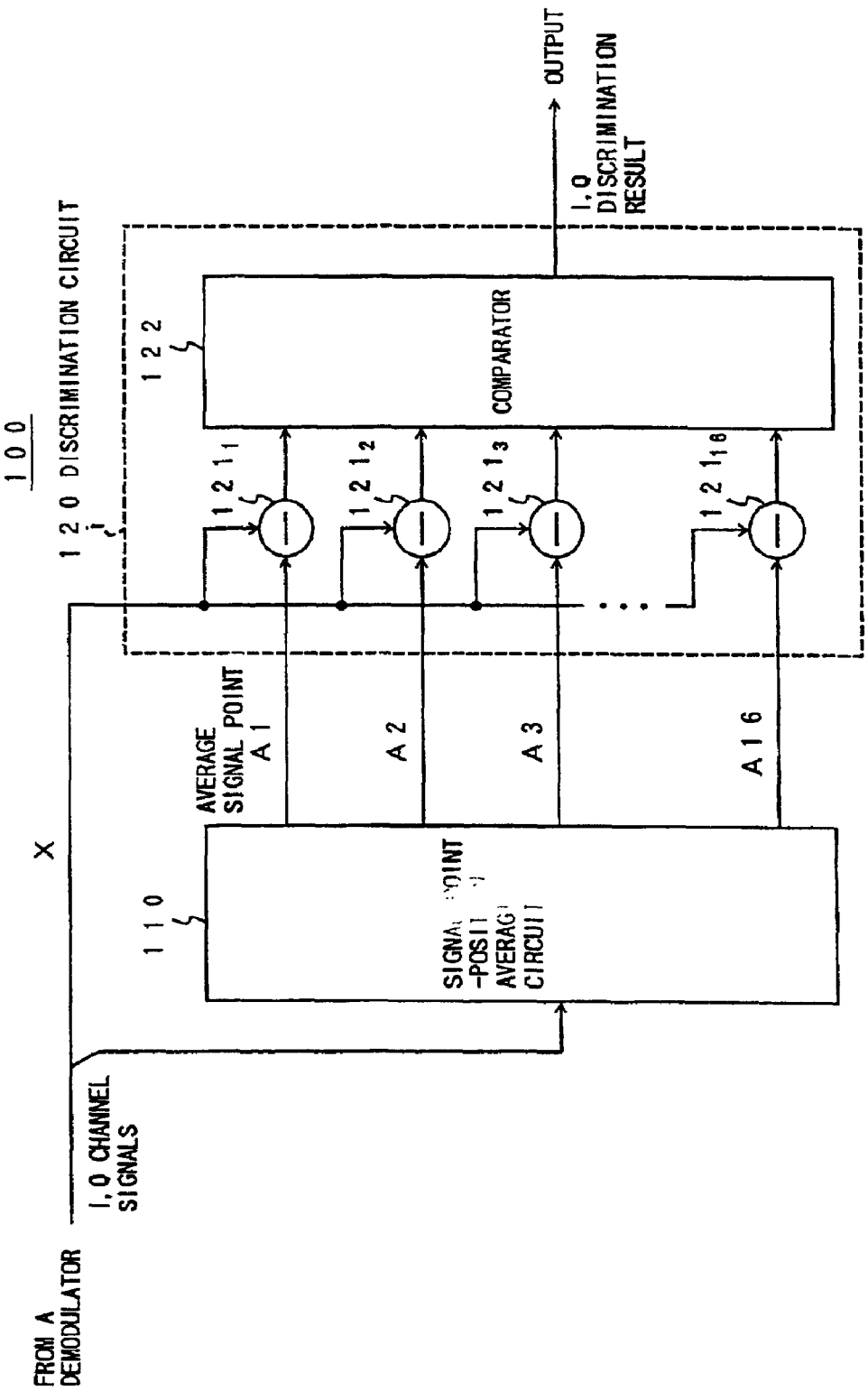
FIG. 5 shows a block diagram of a first embodiment of the distortion compensating device according to the present invention.
Figure 6:
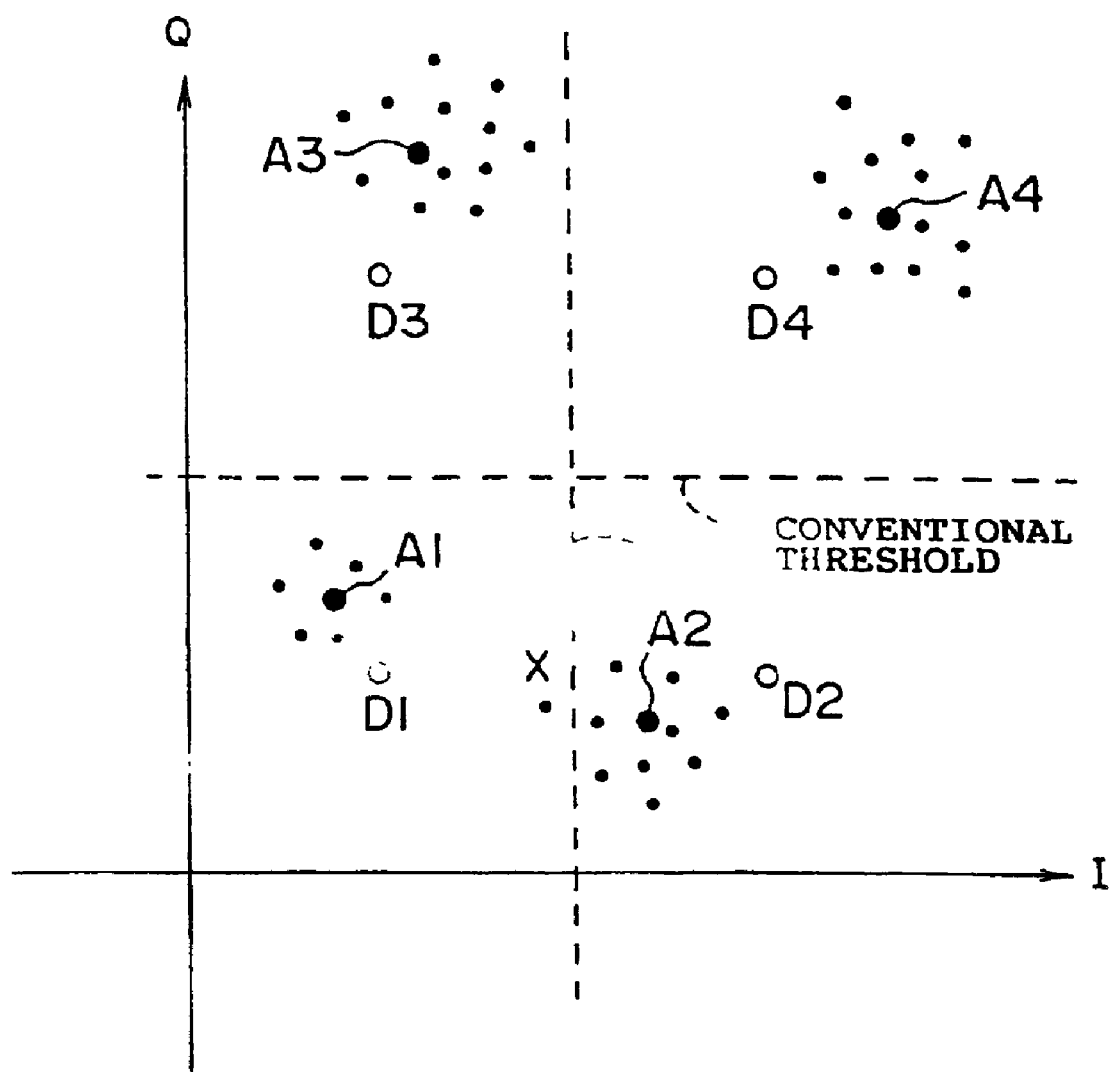
FIG. 6 shows a signal space diagram for explaining an operation principle of the first embodiment of the distortion compensating device shown in FIG. 5.

Next, a description will be given of a first embodiment of the distortion compensating device according to the present invention, by referring to FIG. 5 and FIG. 6. FIG. 5 shows a block diagram of the first embodiment of the distortion compensating device according to the present invention. FIG. 6 shows a signal space diagram for explaining an operation principle of the first embodiment of the distortion compensating device shown in FIG. 5. The distortion compensating device shown in FIG. 5 comprises a signal-point-position averaging circuit 110 for calculating the average position of each signal point in the space diagram and a discrimination circuit 120. The discrimination circuit 120 is constructed with 16 pairs of subtracting circuits $121_1$ to $121_{16}$ for the signal points of 16QAM and a comparator 122.

The I-channel and Q-channel signals from the demodulator 75 shown in FIG. 4 are applied to the signal-point-position averaging circuit 110 and the discrimination circuit 120. The I-channel and Q-channel signals from the demodulator 75 may be represented by coordinates of the signal points in the signal space diagram as shown in FIG. 6. The coordinates can be determined by, for example, converting the I-channel and Q-channel detected signals in an analog form to the signals in digital form. In the signal-point-position averaging circuit 110, the coordinates of the I-channel and Q-channel signals are held for a time period of several symbols, and the positions of the signal points in the space diagram are respectively averaged in the I-channel and Q-channel.

In FIG. 5, for example, in a first quadrant, average signal points are represented by numerals A1, A2, A3, and A4. In the drawing, ideal signal points in a case of no distortion are represented by specified signal points D1, D2, D3, and D4. In the signal-point-position averaging circuit 110, the average signal points A1 to A16 are obtained, and by the subtracting circuits $121_1$ to $121_{16}$, differences between each of the average signal points and the latest input signal are obtained. These differences are compared with each other in the comparator 122. One of the specified signal points D1 to D16 corresponding to one average signal point (one of A1 to A16) which has a least difference is discriminated, and is converted to I-channel and Q-channel signals to be produced as a discrimination result. Namely, the specified signal point corresponding to one average signal point closest to the input signal point may be obtained as the output of the modulation section.

Now, it is assumed that, for example, a signal X which has been mapped to the specified signal point D2 in the modulation fluctuates to an area of the specified signal point D1 by the distortion. In this case, when the input signal X is discriminated by the conventional threshold shown in FIG. 5, the input signal X is discriminated to the specified signal point D1 which is an error bit. However, by using the distortion compensating device according to the present invention, since the average signal point A2 is closest to the input signal X, the input signal X is discriminated to the specified signal point D2 corresponding to the average-signal point A2. The above discrimination is performed in the comparator 122 which produces the specified signal point D2 in I-channel and Q-channel form. The comparator 122 may produce the average signal point A2, in this case, the following baseband processing circuit easily converts the average signal point to the specified signal point as decision data. In this way, the device may compensate the influence of the distortion.

Figure 7:
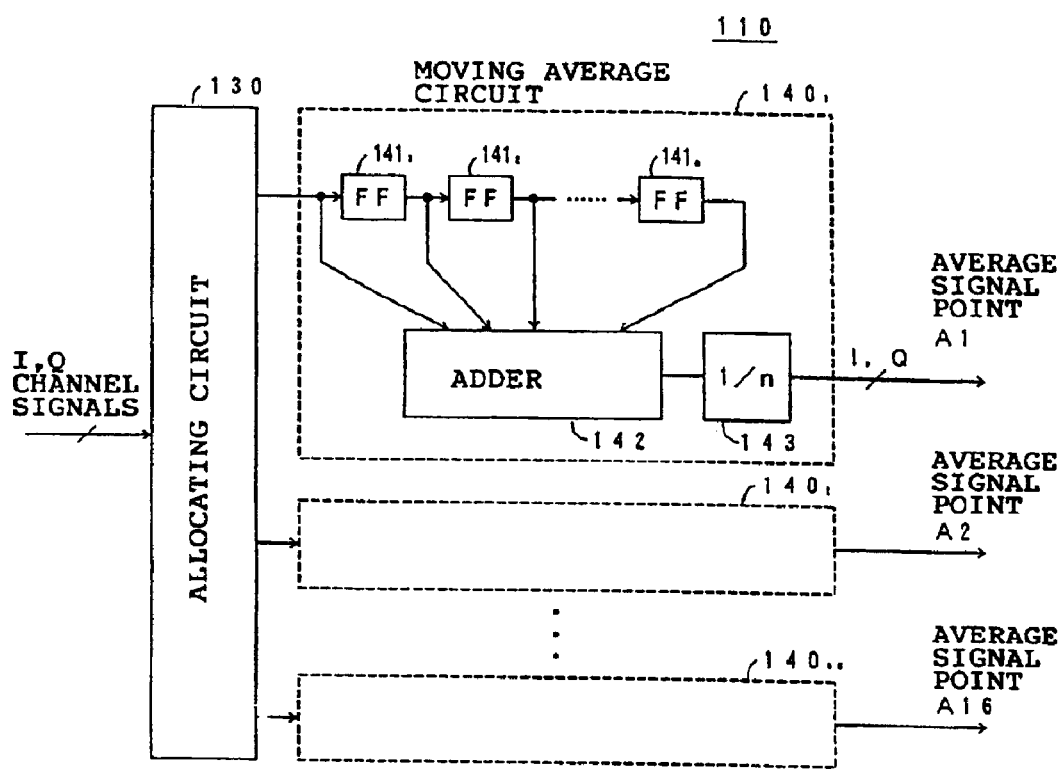
FIG. 7 shows a first example of a signal-point-position averaging circuit shown in FIG. 5.
Figure 8:
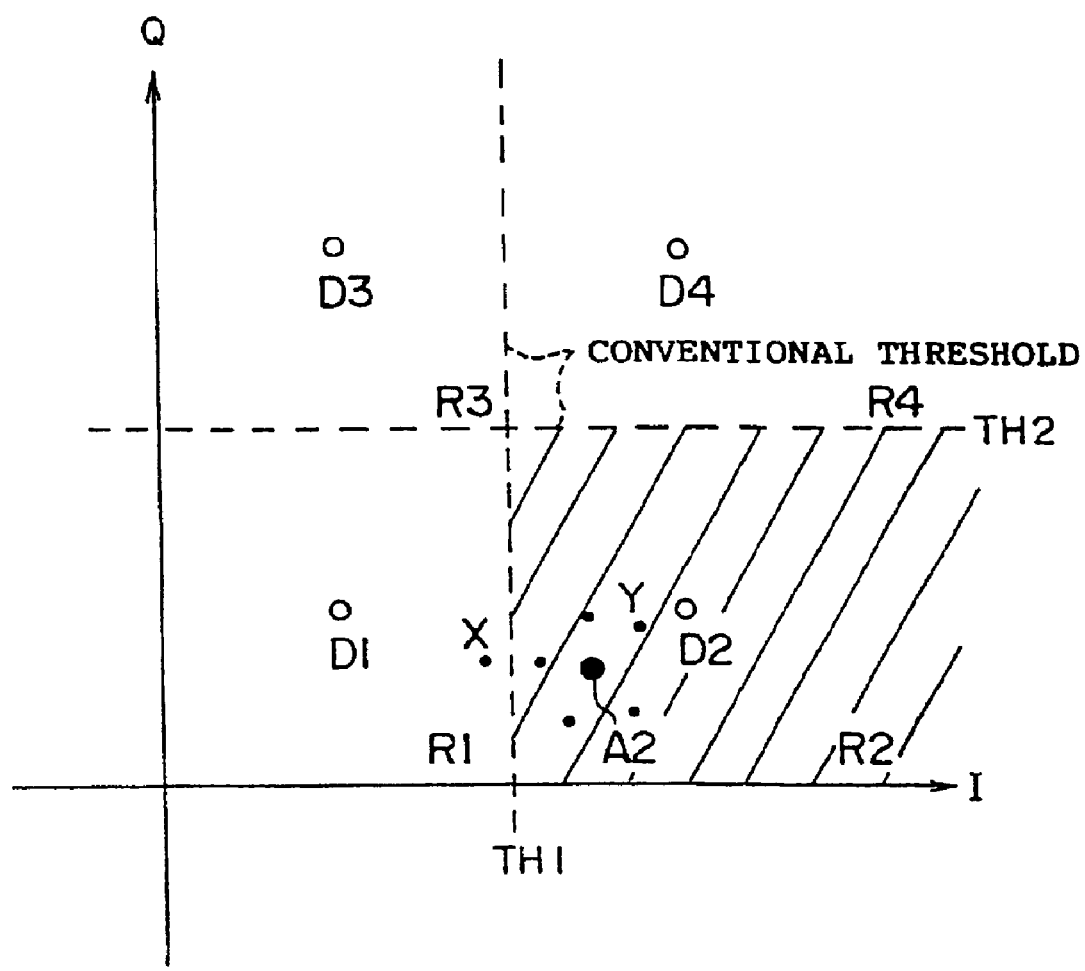
FIG. 8 shows an illustration for explaining an operation principle of the signal-point-position averaging circuit shown in FIG. 7.

Next, a description will be given of an embodiment of the signal-point-position averaging circuit 110 shown in FIG. 5. FIG. 7 shows a first example of the signal-point-position averaging circuit 110. The signal-point-position averaging circuit 110 comprises an allocating circuit 130 and moving average circuits $140_1$ to $140_{16}$. In the case of 16QAM, 16 moving average circuits are required. FIG. 8 shows an illustration for explaining an operation principle of the signal-point-position averaging circuit 110 shown in FIG. 7.

In FIG. 7, the I-channel and Q-channel signals from the demodulator 75 shown in FIG. 5 are applied to the allocating circuit 130. The I-channel and Q-channel signals are the signals which have been demodulated in the coherent detection, and have been respectively converted to digital signals by an analog to-digital converter, etc., in the demodulator 75. Therefore, each of the I-channel and Q-channel signals is formed with digital data of several bits.

In the allocating circuit 130, the successive input signals formed by the I-channel and Q-channel signals are allocated one by one to one of 16 areas R1 to R16 which are partitioned by the threshold levels, as shown in FIG. 8. In FIG. 8, for example, an input signal point Y is allocated to the area R2. By averaging the allocated signals in each area, the average signal point in each area is obtained. In the drawing, though the input signal point X substantially belonging to the area R2 is allocated to the area R1, the allocation gives little influence on averaging the signal points in the areas R1, R2.

The allocating circuit 130 is easily constructed with a comparing circuit comparing the input signal with the threshold level including the I and Q axes. For example, when the I-channel component of the input signal is larger than a threshold TH1 and the Q-channel component thereof is larger than 0 and less than a threshold TH2, it is determined that the input signal point belongs to the area R2. More specifically, if the I-channel and Q-channel components of the input signal are represented by the digital signals, the most significant 4 bits of each digital signal will easily determine which areas the input signal belongs. The determination circuit may be constructed with logic circuits known to those skilled in the art.

The allocated signals are respectively supplied to the corresponding moving average circuits $140_1$ to $140_{16}$. In FIG. 8, for example, the input signal point Y is supplied to the moving average circuit $140_2$. Each of the moving average circuits comprises n flip-flops (FF) $141_1$ to $141_n$ connected in series, an adder 142 summing outputs from the n flip-flops, and a 1/n-divider 143 dividing an output of the adder by n. In each moving average circuit 140, the input signal is shifted by a symbol timing. Therefore, a number n of input signals are held for each period of the symbol timing. For each symbol timing, the average of the n input signals is obtained by using the adder 142 and the divider 143. At each symbol timing, since a new input signal is applied and an oldest input signal is exhausted in the moving average circuit, the average value is updated. In this way, the moving averages in the respective areas R1 to R16 are obtained.

In the above description, the allocating operation in the allocating circuit 130 is performed according to the areas defined by the conventional threshold levels. However, after the average signal points are obtained, the average signal points may define new threshold levels. Therefore, after that, the allocating operation in the allocating circuit 130 may be performed according to the areas defined by the new threshold levels. Accordingly, more accurate average positions of the signal points may be calculated.

Figure 9:
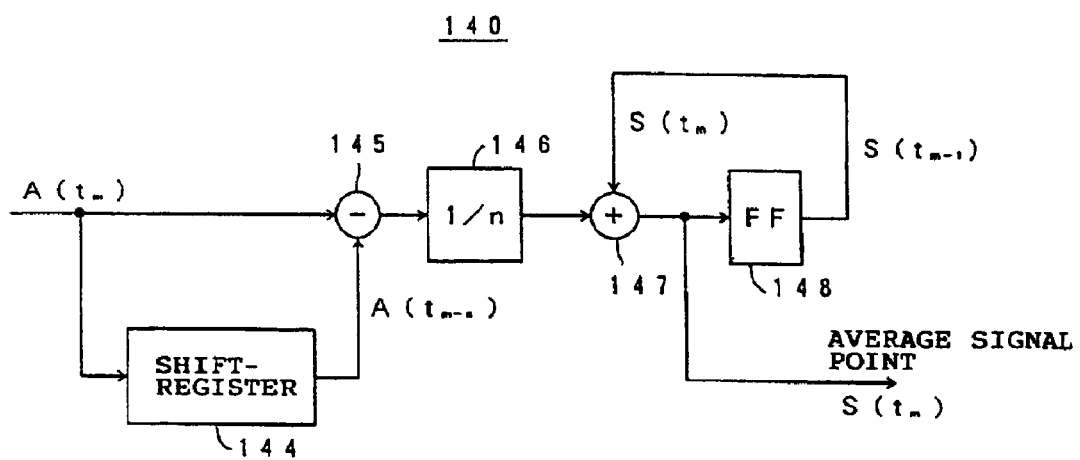
FIG. 9 shows another configuration example of the moving average circuit shown in FIG. 7.

FIG. 9 shows another configuration example of the moving average circuit shown in FIG. 7. The moving average circuit 140 shown in FIG. 9 comprises n-stages shift register 144, a subtracting circuit 145, a 1/n divider 146, an adder 147, and a flip-flop 148. In general, the moving average $S(t_m)$ in the average circuit 140 is represented as follows:

$$S(t_m) = \left( \sum_{t_{m-n+1}}^{t_m} A(t) \right) / n, \quad (1)$$

where A(t) is data indicating a position of the signal point. By transforming an equation $S(t_m)-S(t_{m-1})$, the following equation is obtained.

$$S(t_m)=S(t_{m-1})+(A(t_m)-A(t_{m-n}))/n \quad (2)$$

The second term of the equation (2) indicates a circuit constructed with the n-stages shift register 144, the subtracting circuit 145, and the 1/n divider 146. The first term of the equation (2) indicates a circuit constructed with the adder 147 and the flip-flop 148.

Figure 10:
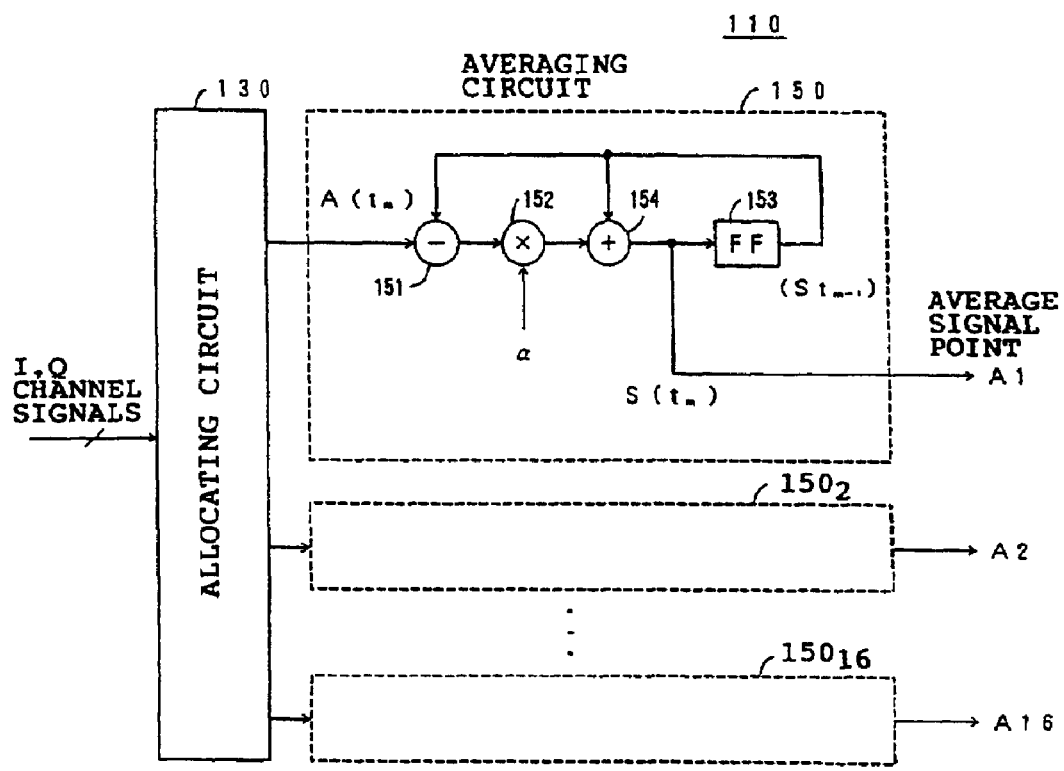
FIG. 10 shows a second example of the signal-point-position averaging circuit shown in FIG. 5.
Figure 11:
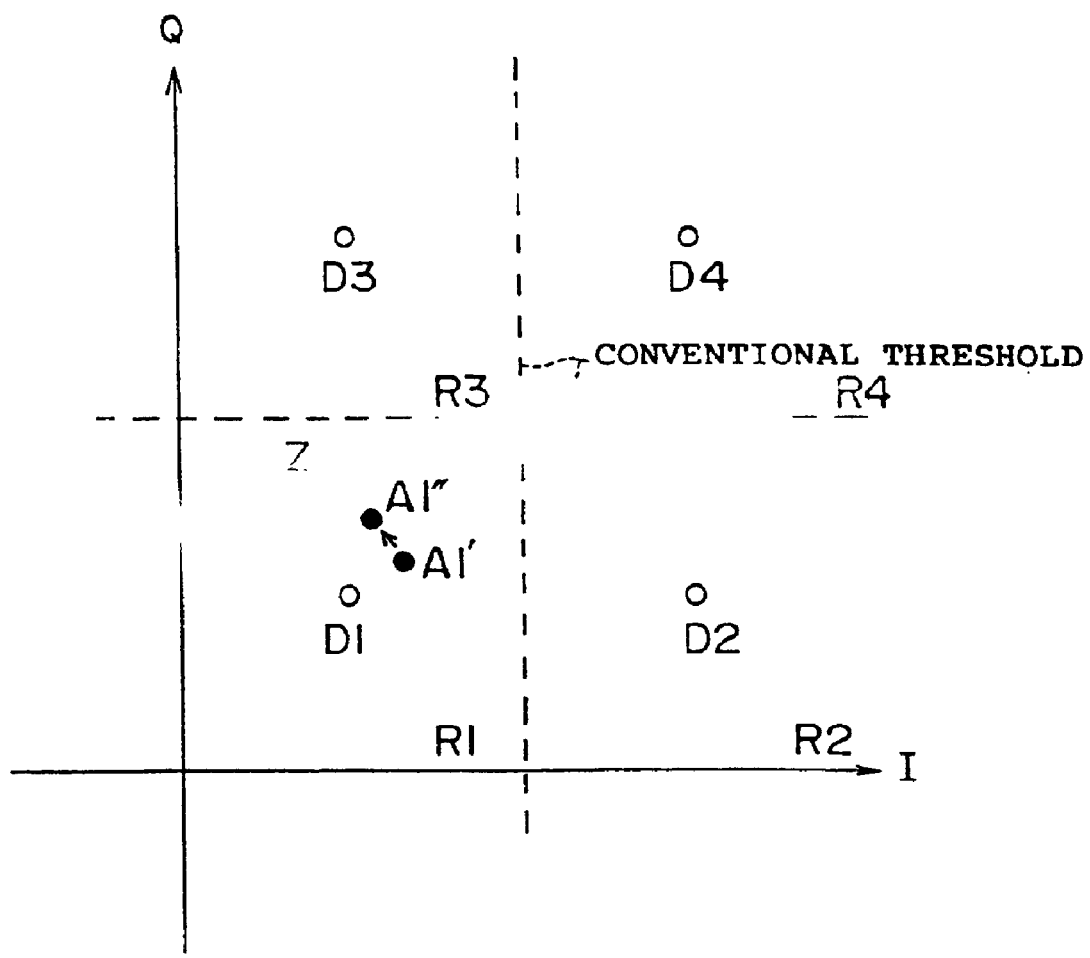
FIG. 11 shows an illustration for explaining the operation principle of the signal-point-position averaging circuit shown in FIG. 10.

FIG. 10 shows a second example of the signal-point-position averaging circuit shown in FIG. 5. The signal-point-position averaging circuit 110 shown in FIG. 10 comprises the allocating circuit 130 and an averaging circuit $150_1$ to $150_{16}$. The allocating circuit 130 is the same as the circuit 130 shown in FIG. 7. In the case of 16QAM, 16 averaging circuits 150 are required. In each averaging circuit 150, the averaging calculation is individually performed for respective I-channel and Q-channel signals. FIG. 11 shows an illustration for explaining the operation principle of the signal-point-position averaging circuit shown in FIG. 10.

The I-channel and Q-channel signals from the demodulator 75 are allocated to one of the areas defined by the conventional threshold levels in the allocating circuit 130 in the same way as that of the circuit 130 shown in FIG. 7. The allocated I-channel and Q-channel signals are supplied to the averaging circuit 150 corresponding to the area to which the input signal has been allocated. Each of the averaging circuits $150_1$ to $150_{16}$ comprises a subtracting circuit 151, a multiplier 152, and a flip-flop 153. The configuration of the averaging circuit indicates that the average signal point $S(t_m)$ is obtained by the following equation.

$$S(t_m)=S(t_{m-1})+(A(t_m)-A(t_{m-1}))\times\alpha \quad (3)$$

where $A(t_m)$ is the input signal at an instance $t_m$.

In the above equation, a difference between the input signal $A(t_m)$ and the latest average signal point $S(t_{m-1})$ before the instance $t_m$ is multiplied by a factor α, and the multiplied result is added to the latest average signal point $S(t_{m-1})$. As shown in FIG. 11, for example, when an input signal point Z is applied to the area corresponding to the specified signal point D1, the difference between the input signal point Z and the latest average signal point A1' is calculated, and the latest average signal point A1' is shifted to a new signal point A1" by a portion of the difference defined by the factor α. By repeating these operations, $S(t_m)$ is converged to the average signal point A1. Though the above operation is based on a vector calculation, scalar calculations in the I-channel and Q-channel components may be practically used. The factor α corresponds to a time constant of the convergence. When the factor α is large, a fast convergence with a large fluctuation is expected, while when the factor α is small, a slow convergence with a small fluctuation is expected. An initial value of $S(t_{m-1})$ is not restricted, but is commonly set to the specified signal point.

Figure 12:
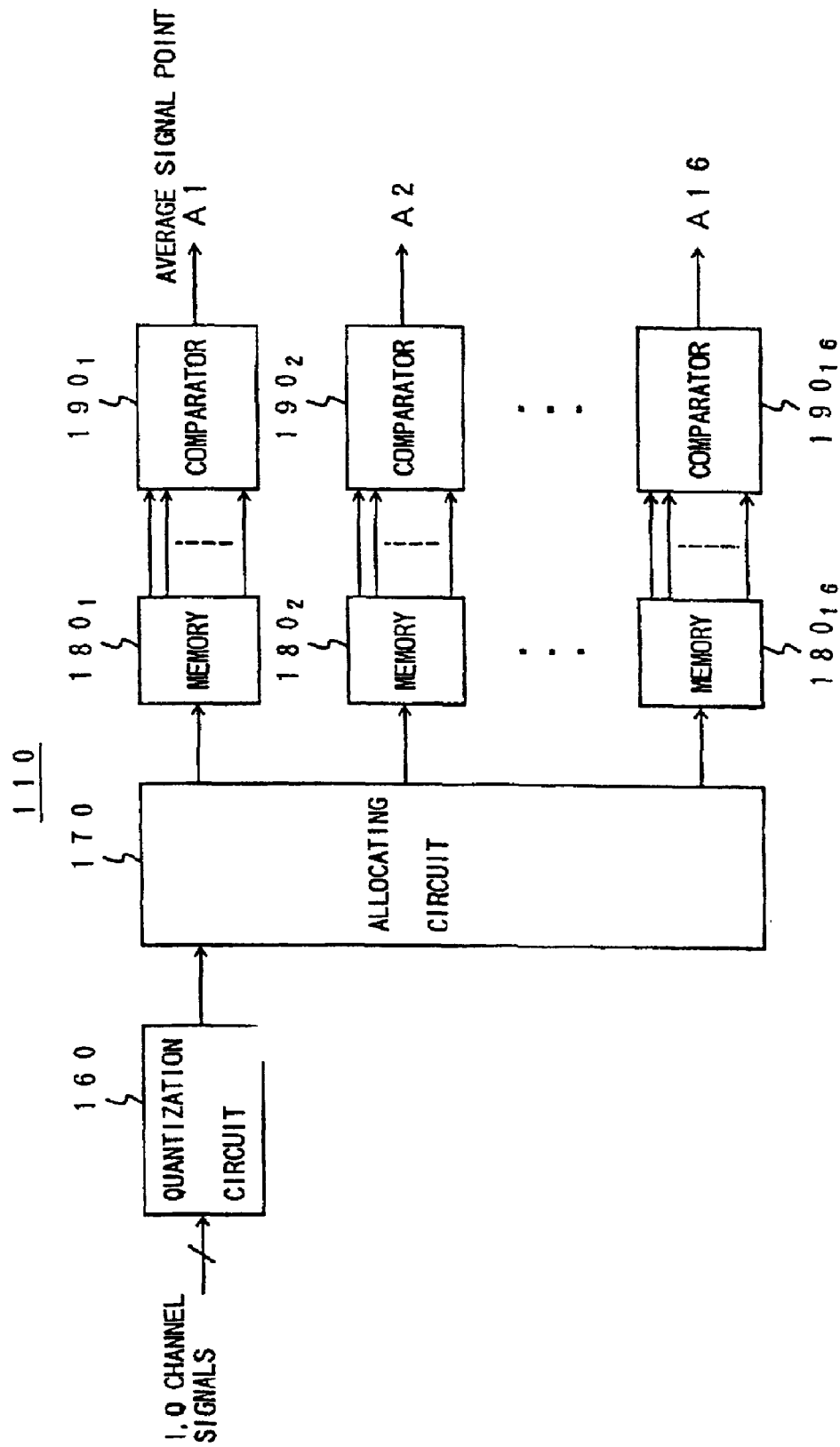
FIG. 12 shows a third example of the signal-point-position averaging circuit shown in FIG. 5.
Figure 13:
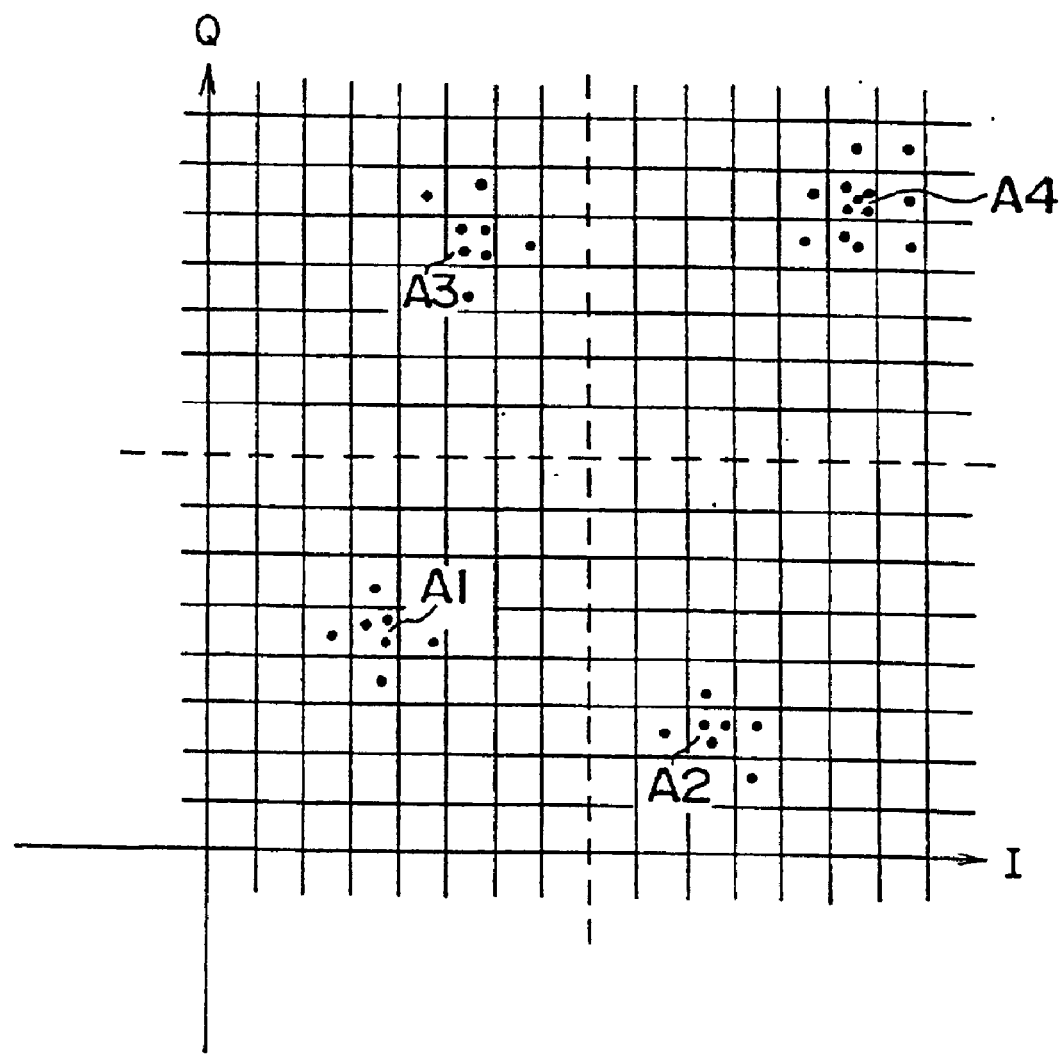
FIG. 13 shows an illustration for explaining the operation principle of the signal-point-position averaging circuit shown in FIG. 12.

FIG. 12 shows a third example of the signal-point-position averaging circuit 110 shown in FIG. 5. And FIG. 13 shows an illustration for explaining the operation principle of the signal-point-position averaging circuit shown in FIG. 12. The signal-point-position averaging circuit 110 shown in FIG. 12 comprises a quantization circuit 160, an allocating circuit 170, memories $180_1$ to $180_{16}$, and comparators $190_1$ to $190_{16}$. Each of memories $180_1$ to $180_{16}$ has an increment function.

In the quantization circuit 160, the I-channel and Q-channel signals from the modulator 75 shown in FIG. 4 are respectively quantized in a plurality of elements to which the whole space is coarsely partitioned as shown in FIG. 13. When the I-channel and Q-channel components of the input signal are already finely quantized by the analog-to-digital converter, etc., these finely-quantized signals are converted to the coarsely-quantized signals in the quantization circuit 160. A bit number for the quantizing in the quantization circuit 160 is preferably, for example, 4 bits to 8 bits for 16QAM. When the bit number for the quantizing is less than these values, it is difficult to discriminate the average signal point and the specified signal point. When the bit number is larger than these values, further improvement of the discrimination may not be expected. In FIG. 13, a plurality of input signal points are quantized to the same element.

In FIG. 12, the I-channel and Q-channel signals which are quantized to each element are supplied to the memory 180 corresponding to the associated area by the allocating circuit 170. In the signal-point-position averaging circuit 110 shown in FIG. 12, the memories $180_1$ to $180_{16}$ are provided for each area partitioned by the threshold levels. In the allocating circuit 170, by the most significant 4 bits of the output data of the quantization circuit 160, the output data is allocated to the corresponding one of the 16 memories. When the output data of the quantization circuit 160 is supplied to the address of each memory 180, each memory 180 reads data defined by the address data, and adds 1 to the data. The added data is re-written into the memory. In the above operation, the accessed data is incremented by 1, therefore, distribution of the signal points in the elements of the space diagram is obtained. After the distribution of the signal points is obtained, each comparator 190 derives the distribution from each memory 180 and produces a position of the element having the largest number of signal points as the average signal point.

Figure 14:
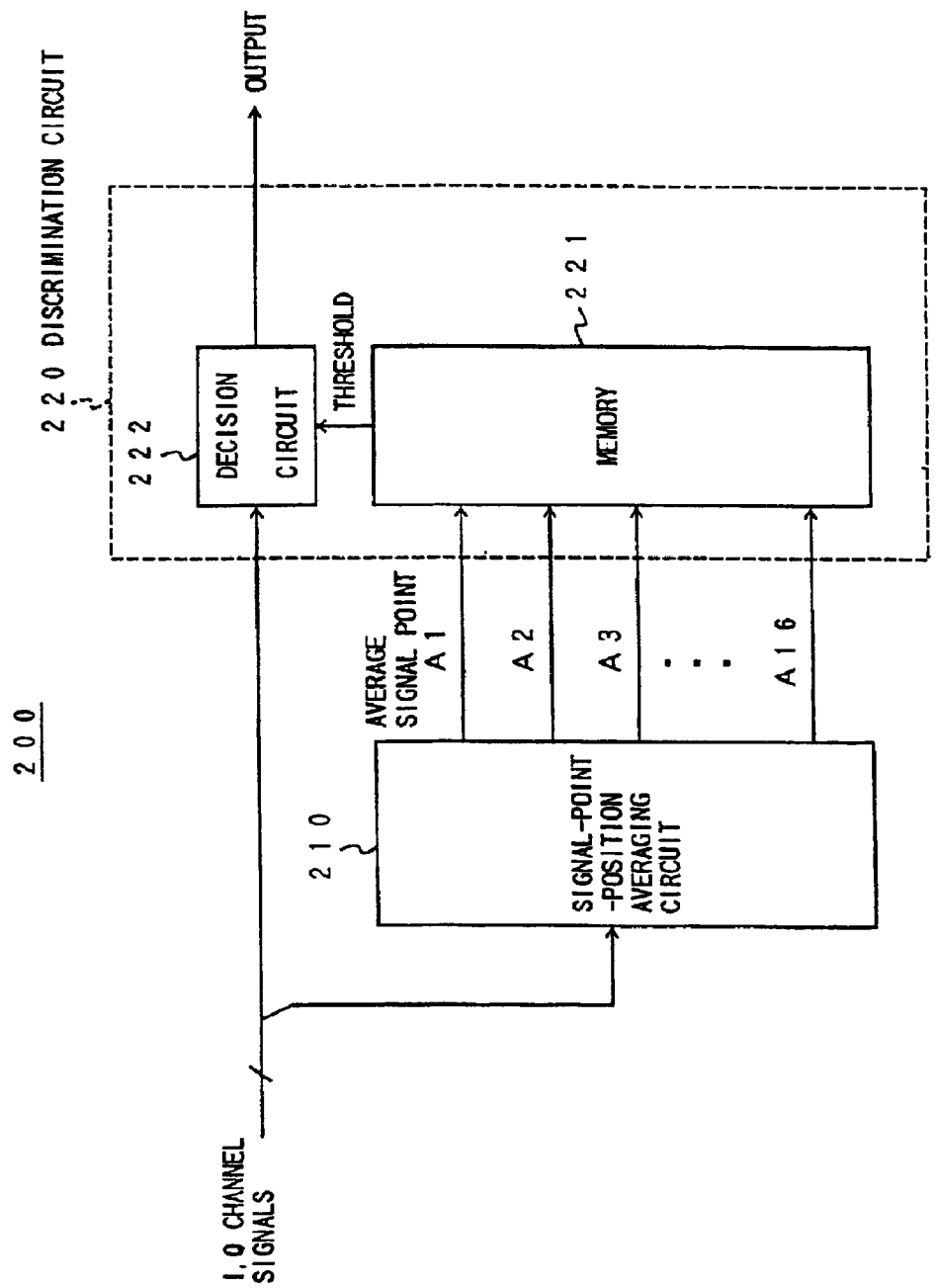
FIG. 14 shows a block diagram of a second embodiment of the distortion compensating device according to the present invention.
Figure 15:
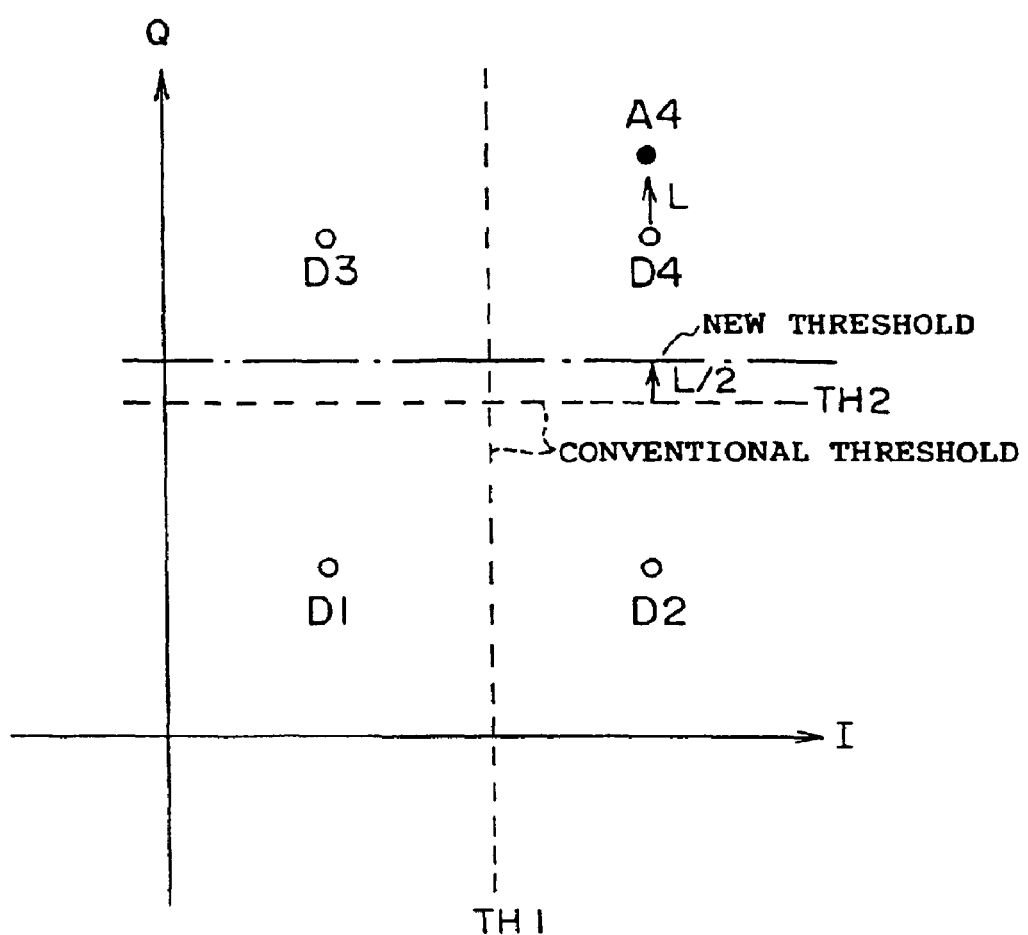
FIG. 15 shows the signal space diagram for explaining the operation principle of the second embodiment of the distortion compensating device shown in FIG. 14.

Next, a description will be given of a second embodiment of the distortion compensating device according to the present invention, by referring to FIG. 14 and FIG. 15. FIG. 14 shows a block diagram of the second embodiment of the distortion compensating device according to the present invention. FIG. 15 shows the signal space diagram for explaining the operation principle of the second embodiment of the distortion compensating device shown in FIG. 14. A distortion compensating device 200 comprises a signal-point-position averaging circuit 210 and a discrimination circuit 220. The signal-point-position averaging circuit 210 may have the same configuration as that of the circuit 110 shown in FIG. 5. Therefore, the signal-point-position averaging circuit 210 also produces the average signal points A1 to A16. These average signal points A1 to A16 with the I-channel and Q-channel signals from the demodulator 75 shown in FIG. 4 are supplied to the discrimination circuit 220.

In the discrimination circuit 220, first, a difference between each average signal point and the corresponding specified signal point is calculated for each average signal point. Next, the conventional threshold is shifted by half of the difference. For example, in FIG. 15, when the average signal point A4 is obtained at a distance L apart from the specified signal point D4, the conventional threshold TH2 is shifted by half of the distance L in a negative direction of the Q axis. While, when the average signal point A4 is obtained at any distance apart from the specified signal point D4 in a positive direction of the I axis, the conventional threshold TH1 is shifted by half of the distance in the same direction. When the average signal point A4 is obtained at any distance apart from the specified signal point D4 in any direction between the I and Q axes, the conventional thresholds TH1 and TH2 are shifted.

In fact, according to the distortion characteristics of the amplifier, a plurality of average signal points may be obtained apart from respective corresponding specified signal points. However, it is supposed that the signal point which has the strongest distortion exists in the surrounding of the space diagram. This is due to the fact, as the level of the signal is increased, the signal is easier to distort. Therefore, even if the threshold is controlled according to only the signal points in the surrounding of the space diagram, effective distortion compensation may be achieved.

The discrimination circuit 220 is constructed with a memory 221 and a decision circuit 222. The memory 221 produces the new-threshold based on the value of the average signal point. In the decision circuit 222, the I-channel and Q-channel signals from the demodulator 75 are discriminated by the newly set threshold, and the corresponding specified signal point is produced as an output of the discrimination circuit 220. By integrating the function of the decision circuit 222 into the memory 221, the discrimination circuit 220 may be constructed with only the memory.

Figure 16:
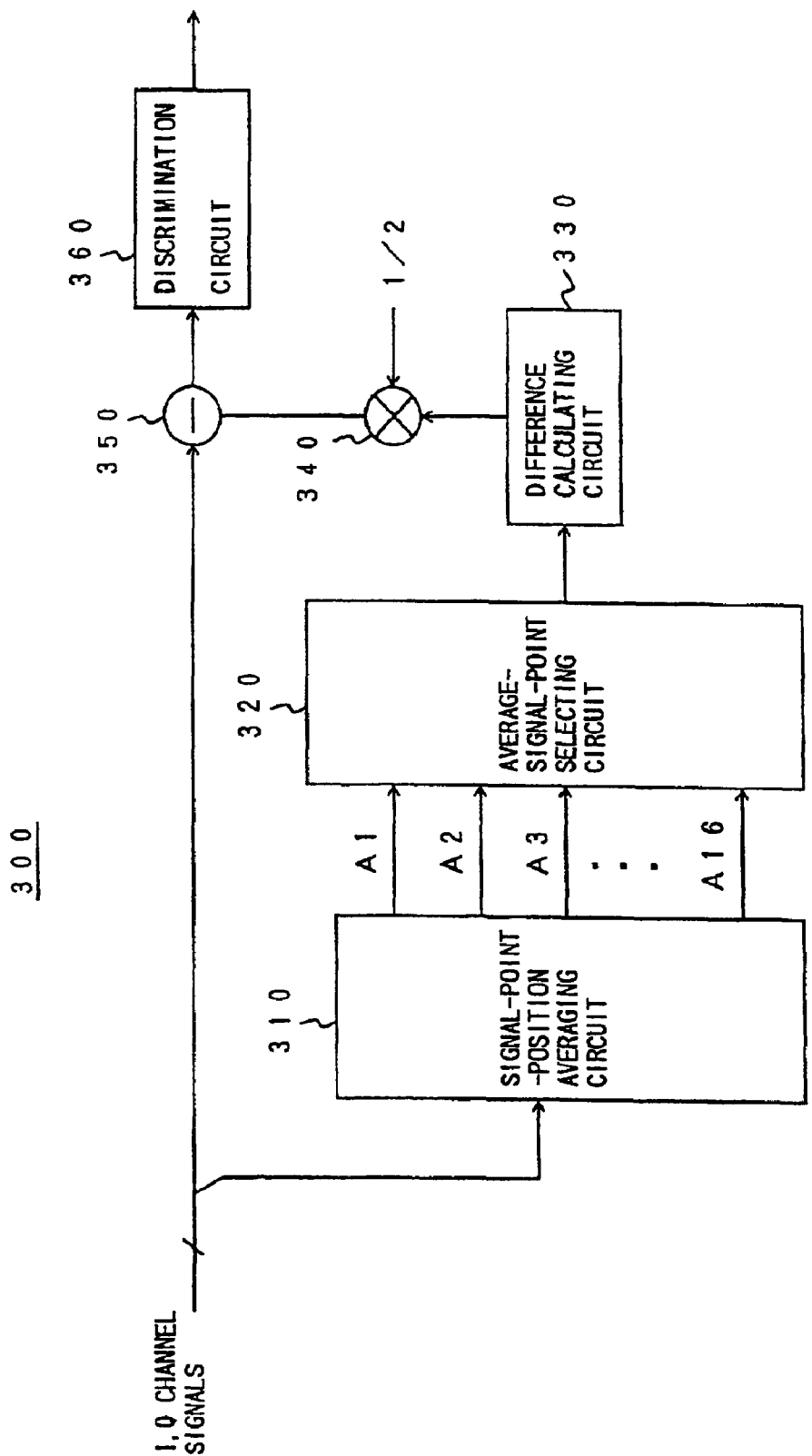
FIG. 16 shows a block diagram of a third embodiment of the distortion compensating device according to the present invention.
Figure 17:
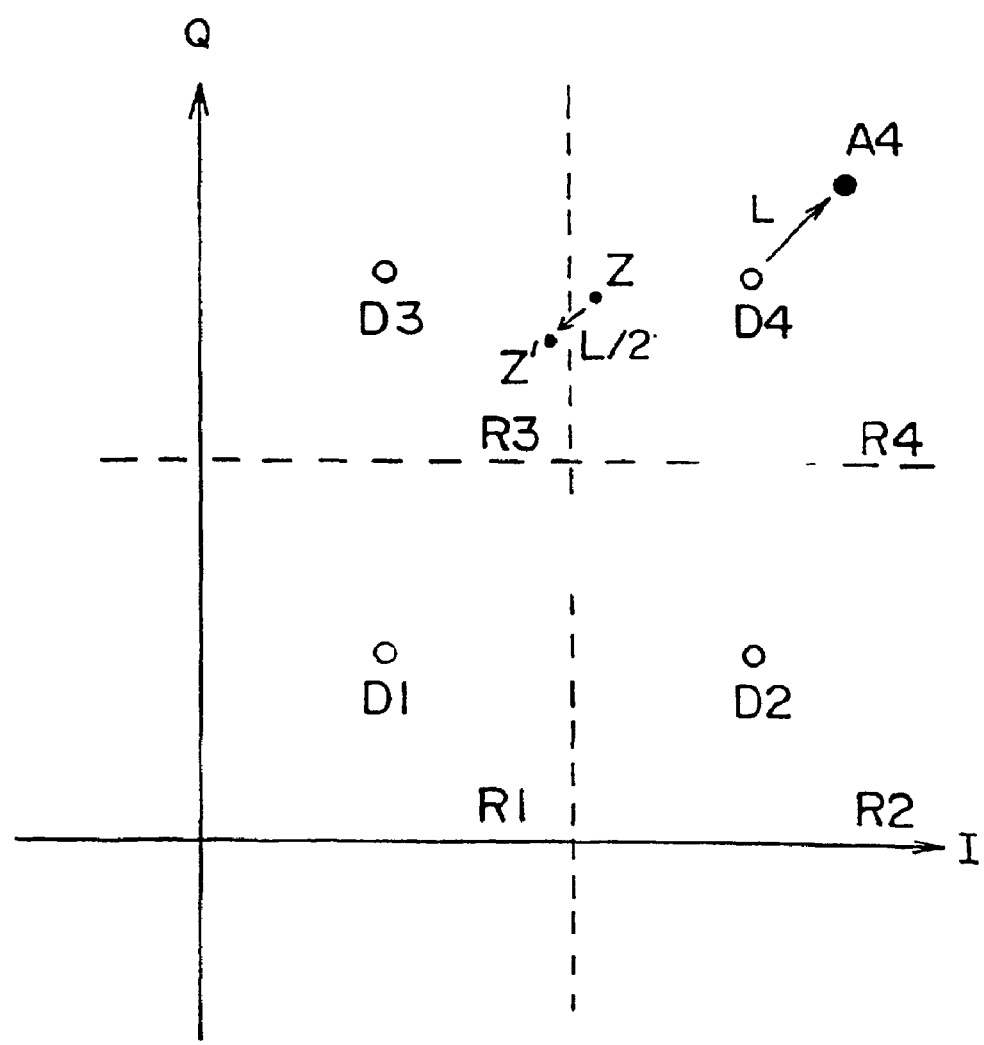
FIG. 17 shows the signal space diagram for explaining the operation principle of the third embodiment of the distortion compensating device shown in FIG. 16.

Next, a description will be given of a third embodiment of the distortion compensating device according to the present invention, by referring to FIG. 16 and FIG. 17. FIG. 16 shows a block diagram of the third embodiment of the distortion compensating device according to the present invention. FIG. 17 shows the signal space diagram for explaining the operation principle of the third embodiment of the distortion compensating device shown in FIG. 16. A distortion compensating device 300 shown in FIG. 16 comprises a signal-point-position averaging circuit 310, an average-signal-point selecting circuit 320, a difference calculating circuit 330, a multiplier 340, a subtracting circuit 350, and a discrimination circuit 360. The signal-point-position averaging circuit 310 may have the same configuration as that of the circuit 110 shown in FIG. 5. Therefore, the signal-point-position averaging circuit 310 also produces the average signal points A1 to A16. These average signal points A1 to A16 are supplied to the average-signal-point selecting circuit 320.

In the average-signal-point selecting circuit 320, one of the average signal points A1 to A16 is selected according to the I-channel and Q-channel signals from the demodulator 75. This selection is performed by deciding the position of the I-channel and Q-channel signals based on the conventional threshold. The average signal point which belongs to the decided area is selected. In the difference calculating circuit 330, the difference between the selected average signal point and the corresponding specified signal point is calculated. The difference is multiplied by a factor of ½ in the multiplier circuit 340, and in the subtracting circuit 350, the input signal having the I-channel and Q-channel components is subtracted by the output of the multiplier 340. The output of the subtracting circuit 350 is discriminated by the conventional threshold in the discrimination circuit 360.

For example, in FIG. 17, when the input signal point Z at the area R4 is supplied to the distortion compensating device 300, the average-signal-point selecting circuit 320 selects the average signal point A4 from the already calculated average signal points. In the difference calculating circuit 330, the difference L (=average signal point A4−specified signal point D4) is calculated. In the subtracting circuit 350, a distortion compensated input signal point Z' is obtained by subtracting L/2 from the input signal point Z. Namely, even if the signal point Z which is to be detected in the area R3 without distortion is fluctuated to the area R4 by the distortion, the fluctuation may be compensated by the above distortion-compensating operation. The above calculations are performed by regarding each signal point as the vector. In the practical circuit, the calculations in vector form are performed in scalar form for respective I-channel and Q-channel components.

Figure 18:
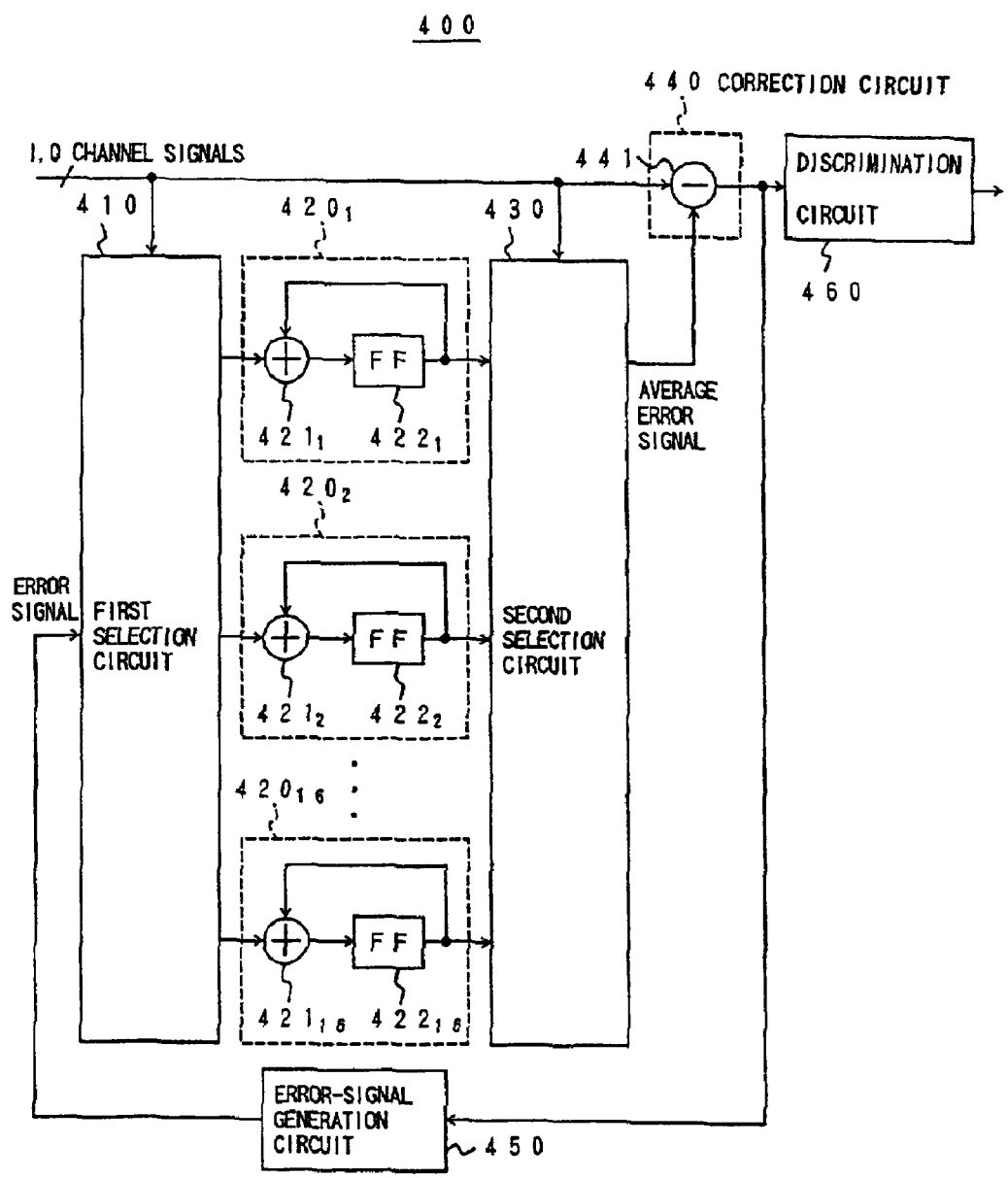
FIG. 18 shows a block diagram of a fourth embodiment of the distortion compensating device according to the present invention.
Figure 19:
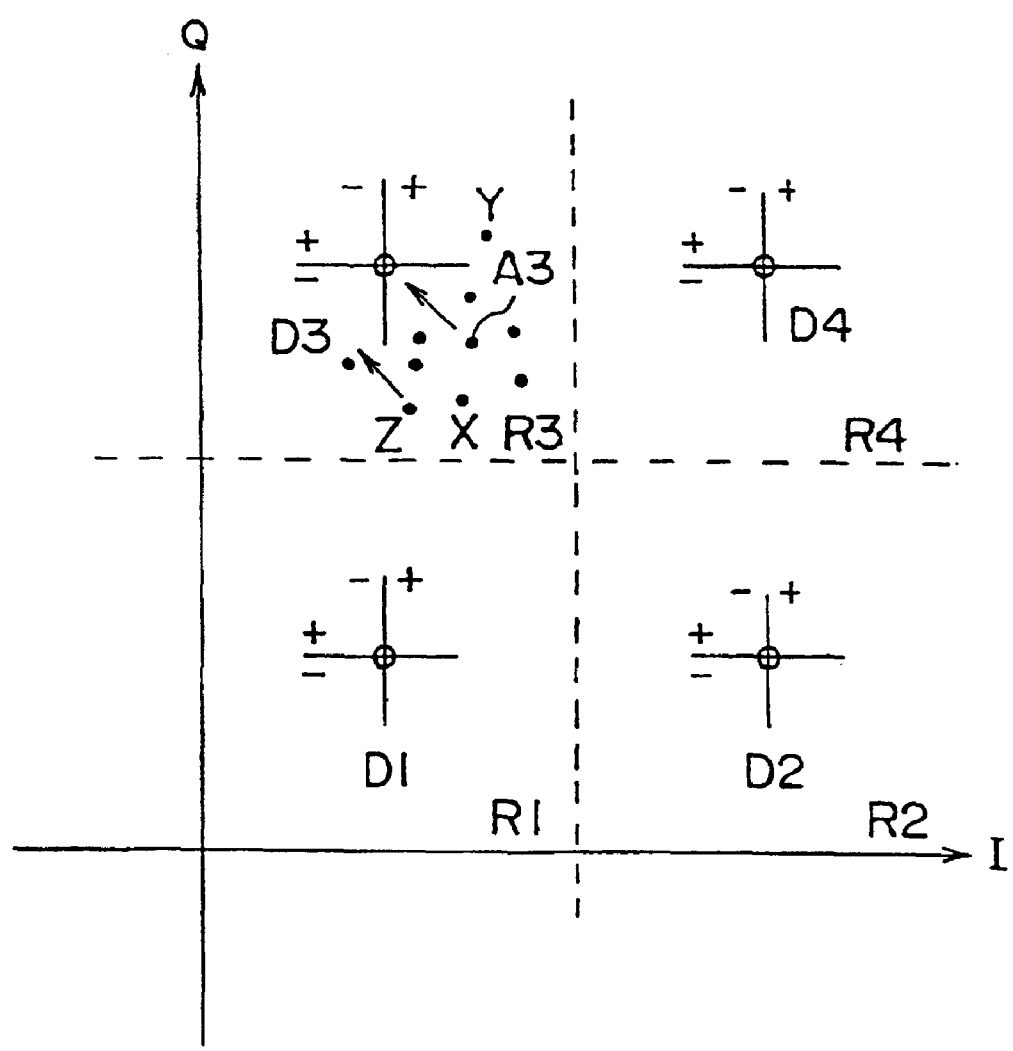
FIG. 19 shows the signal space diagram for explaining the operation principle of the fourth embodiment of the distortion compensating device shown in FIG. 18.

Next, a description will be given of a fourth embodiment of the distortion compensating device according to the present invention, by referring to FIG. 18 and FIG. 19. FIG. 18 shows a block diagram of the fourth embodiment of the distortion compensating device according to the present invention. FIG. 19 shows the signal space diagram for explaining the operation principle of the fourth embodiment of the distortion compensating device shown in FIG. 18. A distortion compensating device 400 shown in FIG. 18 comprises a first selection circuit 410, average-error-signal calculating circuits $420_1$ to $420_{16}$, a second selection circuit 430, a correction circuit 440 including a subtracting circuit 441, an error-signal generation circuit 450, and a discrimination circuit 460.

The I-channel and Q-channel signals from the demodulator 75 shown in FIG. 4 is corrected by being subtracted by an average error signal produced from the second selection circuit 430 in the correction circuit 440. The average error signal is generated by the error-signal generation circuit 450 and the average-error-signal calculating circuits $420_1$ to $420_{16}$. In the error-signal generation circuit 450, the coordinates of the corrected I-channel and Q-channel signals are compared with the coordinates of the specified signal points for deciding which of the signals is larger, and the comparison results in the error signal. For example, in FIG. 19, the corrected signal X is at the area R3, the corrected signal X is compared with the specified signal point D3. In the I-channel direction, the I-channel component of the signal X is larger than that of the specified signal point D3. In the Q-channel direction, the Q-channel component of the signal X is smaller than that of the specified signal point D3. In this case, the error signal of the corrected signal X is represented by (+1, −1). In the same way, the error signal of the corrected signal Y is represented by (+1, +1). The error signal may be also represented by (h, i)×P, where a factor P is an integer. The factor P corresponds to the time constant of the averaging operation.

In FIG. 18, the error signal of the corrected signal X is supplied to the average-error-signal calculating circuit $420_3$ associated with the area R3 by the first selection circuit 410, and is added to the immediately previous average error signal. The added average error signal will be added to the next input average error signal. In each average-error-signal calculating circuit 420, by repeating the above operation, the output of the circuit is converged to the desired average error signal. The converged average error signal corresponds to the difference between the average signal point and the specified signal point. Namely, in the correction circuit 440, each input signal is corrected so that the average signal point can be identical to the corresponding specified signal point. In FIG. 19, when the input signal Z at the area R3 is applied to the distortion compensating device 400, by the correction circuit 440, the input signal point Z is moved in the same transition as that from the average signal point A3 to the specified signal point D3.

As mentioned above, in the distortion compensating device 400, the input signal point is corrected so that the average signal point can be identical to the specified signal point. Therefore, the corrected signal is regarded as the signal in which the nonlinear distortion component imposed to the input signal is removed.

Figure 20:
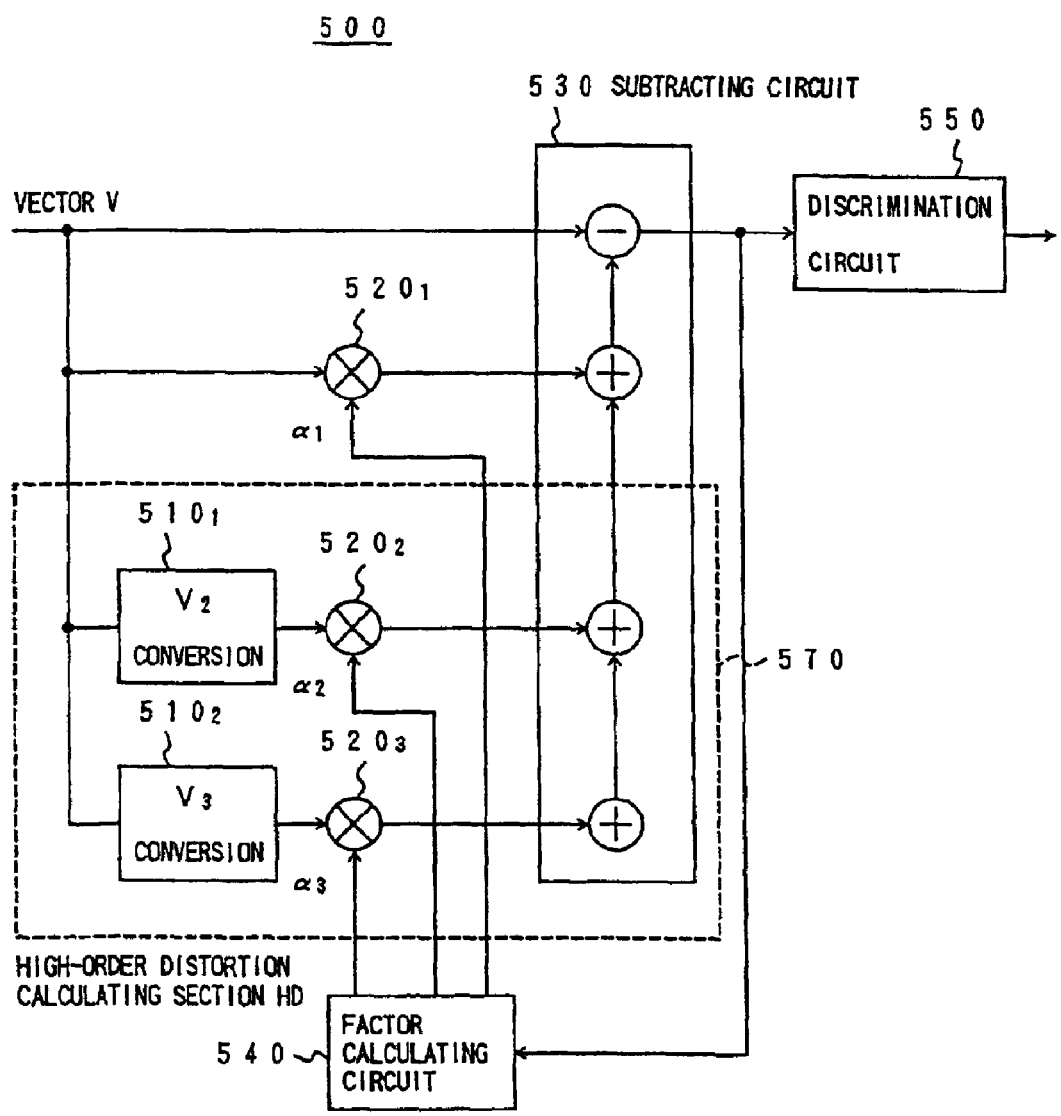
FIG. 20 shows a block diagram of a fifth embodiment of the distortion compensating device according to the present invention.

Next, a description will be given of a fifth embodiment of the distortion compensating device according to the present invention. FIG. 20 shows a block diagram of the fifth embodiment of the distortion compensating device according to the present invention. A distortion compensating device 500 shown in FIG. 20 comprises a $V^2$ converter 510$_1$, a $V^3$ converter 510$_2$, multipliers 520$_1$ to 520$_3$, a subtracting circuit 530, a factor calculating circuit 540, and a discrimination circuit 550.

An input to the distortion compensating device 500 is the I-channel and Q-channel signals from the demodulator 75 shown in FIG. 4, which is represented by a vector V. The $V^2$ converter 510$_1$ and the $V^3$ converter 510$_2$ respectively generate the square and the cube of the vector V. These converters are easily constructed with a ROM storing squaring and cubing functions. In the multipliers 520$_1$ to 520$_3$, the vectors V, $V^2$, $V^3$ are respectively multiplied with the factors $\alpha_1$, $\alpha_2$, $\alpha_3$. In the subtracting circuit 530, the outputs of the multipliers 520$_1$ to 520$_3$ are subtracted from the input vector V. The output of the subtracting circuit 530 is supplied to the discrimination circuit 550, and is discriminated by the given threshold.

In the following, the operation principle of the distortion compensating device 500 will be described. When a vector of the signal which is not distorted yet is represented by a symbol V', an amount of the distortion D is commonly described in the following equation.

$$D = \alpha_1 V' + \alpha_2 V'^2 + \alpha_3 V'^3 \ldots,$$

where $\alpha_n$ is a given factor. Therefore, by subtracting the amount of the distortion D from the distorted input signal, the distortion of the input signal may be compensated. However, since it is difficult to obtain the vector V' without being distorted, in general, the distorted signal vector V is used as the approximation of the vector V'. This is a conventional method which is usually used in the transversal filter, etc. Accordingly, the distortion compensated signal S is described as the vector V minus the amount of the distortion D, which follows:

$$S + V - \alpha_1 V - \alpha_2 V^2 - \alpha_3 V^3 \ldots,$$

where $\alpha_n$ is the given factor. The circuit shown in FIG. 20 is constructed according to the above equation.

In the factor calculating circuit 540, a correlation between the square of the vector V and the error signal E described in FIG. 18 is calculated. The factor $\alpha_n$ is selected so that the correlation result can be small.

In addition to the configuration of the distortion compensating device 500 shown in FIG. 20, circuits for compensating high-order distortion $\alpha_4 V^4$, $\alpha_5 V^5$ may be added to improve compensation accuracy. The above calculation in the vector form can be individually performed for respective I-channel and Q-channel components. However, since the nonlinear distortion of the amplifier includes a rotation of the phase, the distortion in the I-channel component and the distortion in the Q-channel component have an influence on each other. Therefore, the independent calculation may cause a small lack of accuracy. To deal with the problem, next, a sixth embodiment will be proposed.

Figure 21:
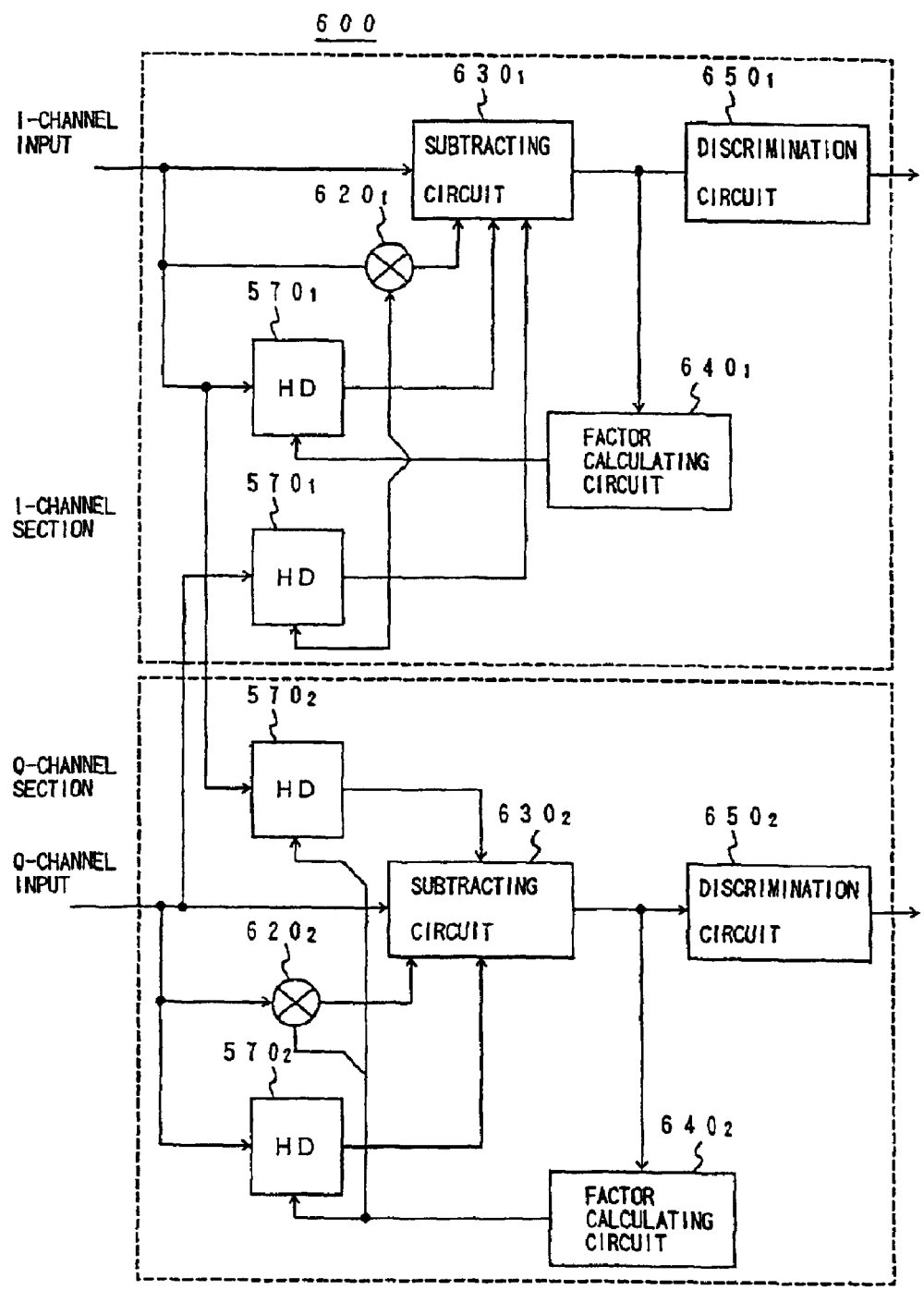
FIG. 21 shows a block diagram of a sixth embodiment of the distortion compensating device according to the present invention.

FIG. 21 shows a block diagram of the sixth embodiment of the distortion compensating device according to the present invention. A distortion compensating device 600 comprises an I-channel section and a Q-channel section. Each section includes the distortion compensating device 500 shown in FIG. 20. In FIG. 21, a symbol HD indicates a high-order distortion calculating section HD shown in FIG. 20. In the distortion compensating device 600 shown in FIG. 21, in addition to the distortion compensating device shown in FIG. 20, the high-order distortion of the I-channel component which is generated in the I-channel section is applied to a subtracting circuit 630$_2$ of the Q-channel section, and the high-order distortion of the Q-channel component which is generated in the Q-channel section is applied to a subtracting circuit 630$_1$ of the I-channel section.

In the distortion compensating device 600, the amount of the distortion in the I-channel component is calculated by taking the distortion of the Q-channel component into account, and vice versa. Therefore, a higher accurate distortion compensation may be realized as compared to the distortion compensating device shown in FIG. 20.

Figure 22:
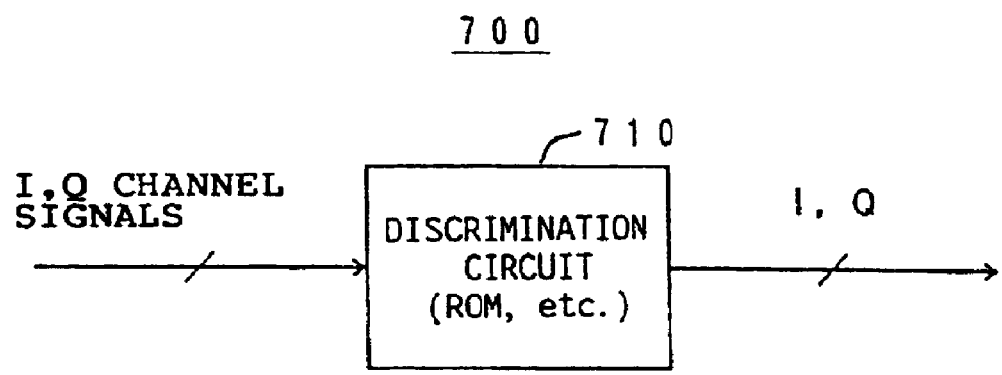
FIG. 22 shows a block diagram of a seventh embodiment of the distortion compensating device according to the present invention.
Figure 23:
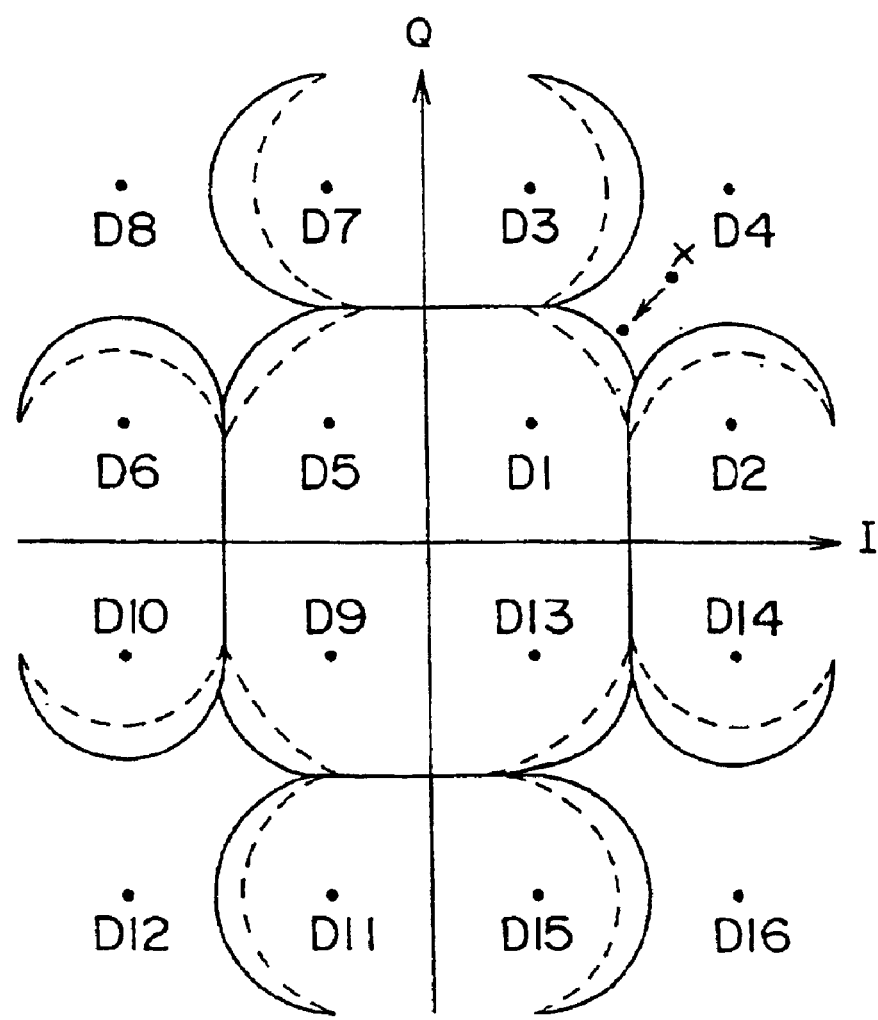
FIG. 23 shows the signal space diagram for explaining the operation principle of the seventh embodiment of the distortion compensating device shown in FIG. 22.

Next, a description will be given of a seventh embodiment of the distortion compensating device according to the present invention, by referring to FIG. 22 and FIG. 23. FIG. 22 shows a block diagram of the seventh embodiment of the distortion compensating device according to the present invention. FIG. 23 shows the signal space diagram for explaining the operation principle of the seventh embodiment of the distortion compensating device shown in FIG. 22. A distortion compensating device 700 shown in FIG. 22 can be constructed with only a discrimination circuit 710.

In general, since for the signal points at the outer side on the space diagram, the transmitting amplifier operates in the operational point close to the saturation range, the distortion due to the nonlinearity of the amplifier strongly influences on the outer side signal points. Therefore, in the receiver, as the signal points are at the outer side on the space diagram, the position of each signal point is fluctuated by the nonlinear distortion.

In the discrimination circuit 710 of the distortion compensating device 700, the threshold for discriminating the input signal is set as shown in FIG. 23. In FIG. 23, the threshold levels for the specified signal points D1, D2, D3, D5, D6, D7, D9, D10, D11, D13, D14, D15 are defined in a circle form to extend the discrimination areas corresponding to the specified signal points D4, D8, D12, D16. For example, even if the signal X which has been mapped to the specified signal point D4 is deviated to the discrimination area for the specified signal point D1 in the conventional threshold, in the newly extended discrimination area, the signal X is correctly discriminated to the specified signal point D4. In this way, a robust performance against distortion may be improved by using the distortion compensating device 700.

As mentioned before, the discrimination circuit 710 of the distortion compensating device 700 is easily constructed with the ROM. In this case, the data stored in the ROM may be the discrimination results for all of the quantized signal points from the demodulator 75 shown in FIG. 4. Namely, the I-channel and Q-channel signals from the demodulator 75 are applied to address inputs of the ROM, and the stored data is produced as the discrimination result. By using the above method, for all signal points, a variety of threshold patterns may be defined on the space diagram. For example, as shown in dashed lines in FIG. 23, a second threshold pattern to further extend the discrimination areas for the outer side signal points may also be defined. In this case, through the robust performance against distortion for the outer side signal points may be improved, a robust performance against noise for the inner side signal points may be decreased. Therefore, when the noise is relatively small by the high received signal level, the second threshold pattern is preferred for obtaining a good transmission performance.

Figure 24:
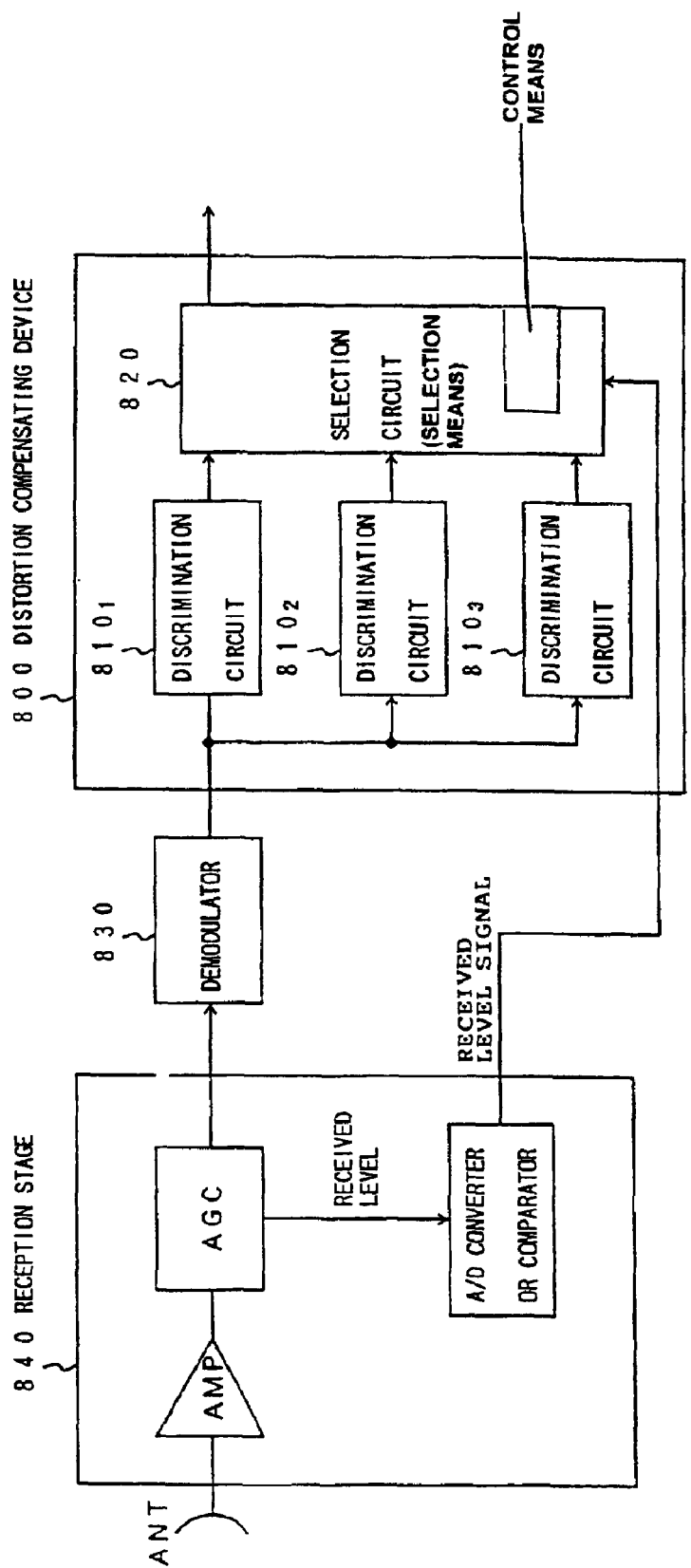
FIG. 24 shows a configuration of a distortion compensating system including an eighth embodiment of the distortion compensating device according to the present invention.

FIG. 24 shows a configuration of a distortion compensating system including an eighth embodiment of the distortion compensating device according to the present invention. The distortion compensating system comprises a reception stage 840, a demodulator 830, and a distortion compensating device 800. The reception stage 840 includes an automatic gain controller (AGC) which can provide a received level of a digital signal to the distortion compensating device 800. The demodulator 830 may be the same as the demodulator 75 shown in FIG. 4. The distortion compensating device 800 comprises a plurality of discrimination circuits $810_1$ to $810_3$ and a selection circuit 820 for selecting one of the outputs of the discrimination circuits.

Each of the discrimination circuits $810_1$ to $810_3$ may have the same configuration as that of the discrimination circuit 710 shown in FIG. 22. However, the discrimination circuits $810_1$ to $810_3$, respectively, have different threshold patterns. For example, the threshold pattern defined in the discrimination circuit $810_1$ is the threshold pattern shown in the dashed line of FIG. 23, the threshold pattern defined in the discrimination circuit $810_2$ is the threshold pattern shown in the solid line of FIG. 23, and the threshold pattern defined in the discrimination circuit $810_3$ is the conventional threshold pattern. In this way, three types of discrimination area pattern are defined by the above three types of threshold patterns.

In the following, a description will be given of the operational principle of the distortion compensating device 800. When the received level detected in the reception stage 840 is indicated to be extremely high from the received level signal, the selection circuit 820 selects the output of the discrimination circuit $810_1$, which may compensate extremely large distortions. When the received level detected in the reception stage 840 is indicated to be relatively high from the received level signal, the selection circuit 820 selects the output of the discrimination circuit $810_2$, which may compensate a relatively large distortion. When the received level detected in the reception stage 840 is indicated to be small from the received level signal, the selection circuit 820 selects the output of the discrimination circuit $810_3$, so as to provide the best transmission performance against the noise. In this way, according to the condition of the distortion and the noise, the proper threshold pattern is selected. Thus, a superior transmission performance with compensation for the distortion may be obtained.

As shown in FIG. 24, the distortion compensating device, in which one of three types of threshold patterns (three types of discrimination area patterns) is selected, is described. However, other distortion-compensating devices, in which one of two types or four types of threshold patterns is selected, are also applicable to the system.

A reference of the received level for the selection of the discrimination circuit may be determined based on the amount of back off of the amplifier. For example, when the received level is higher than a back off of 5 dB, the discrimination circuit $810_1$ is selected; when the received level is at a back off range from 10 dB to 5 dB, the discrimination circuit $810_2$ is selected; and, when the received level is less than a back off of 10 dB, the discrimination circuit $810_3$ is selected.

The plurality of discrimination circuits may be constructed with one ROM. In this case, instead of the selection circuit 820, a selection method of selecting a memory area by an address of one or two bits is applicable.

In the above eighth embodiment, the system has been described of changing the threshold pattern according to the received level in the receiver. This method is supposed to be the same as that of changing the mapping pattern in the modulator of the transmitter.

Figure 25:
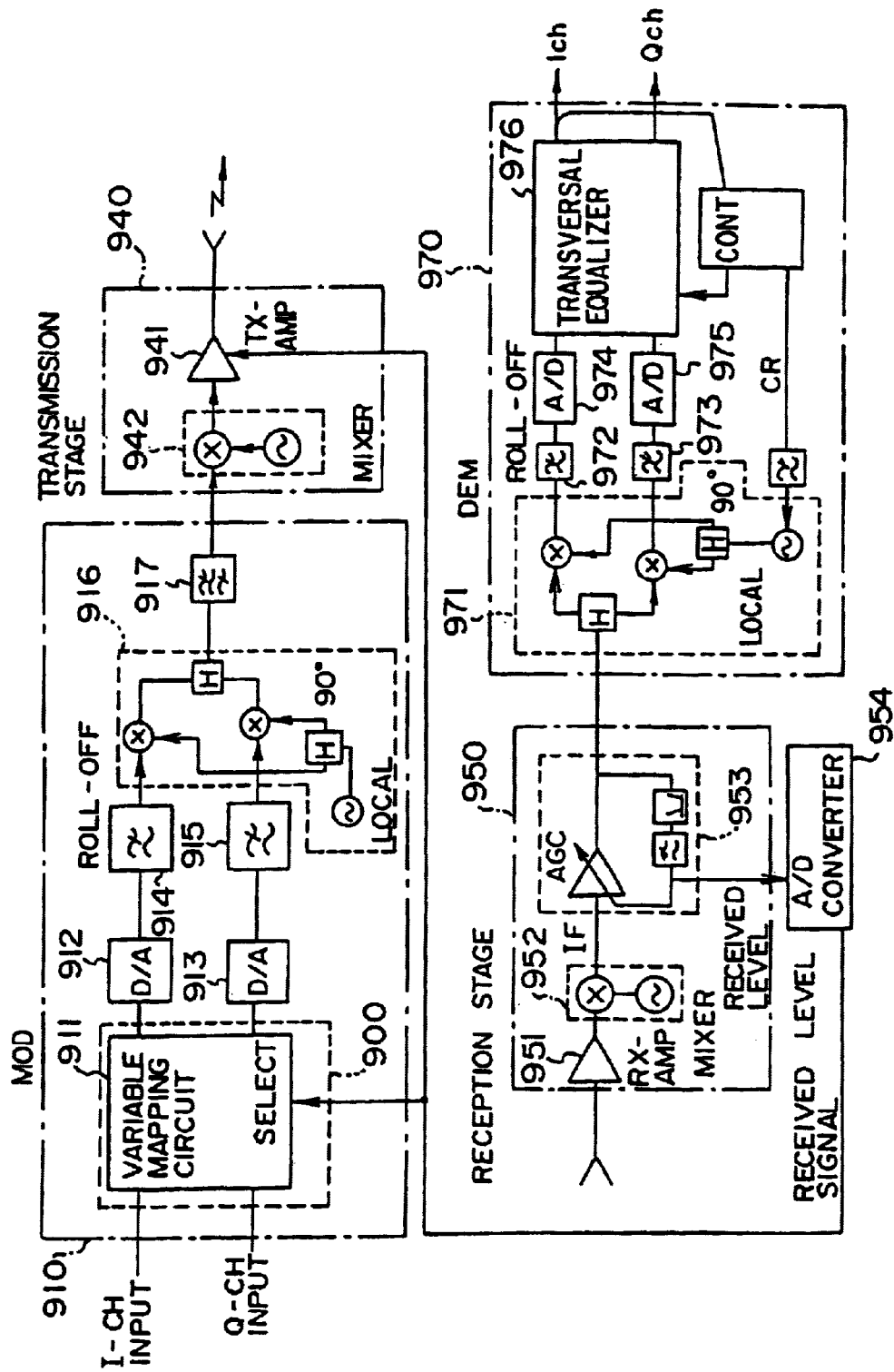
FIG. 25 shows a configuration of a distortion compensating system including a ninth embodiment of the distortion compensating device according to the present invention.
Figure 26:
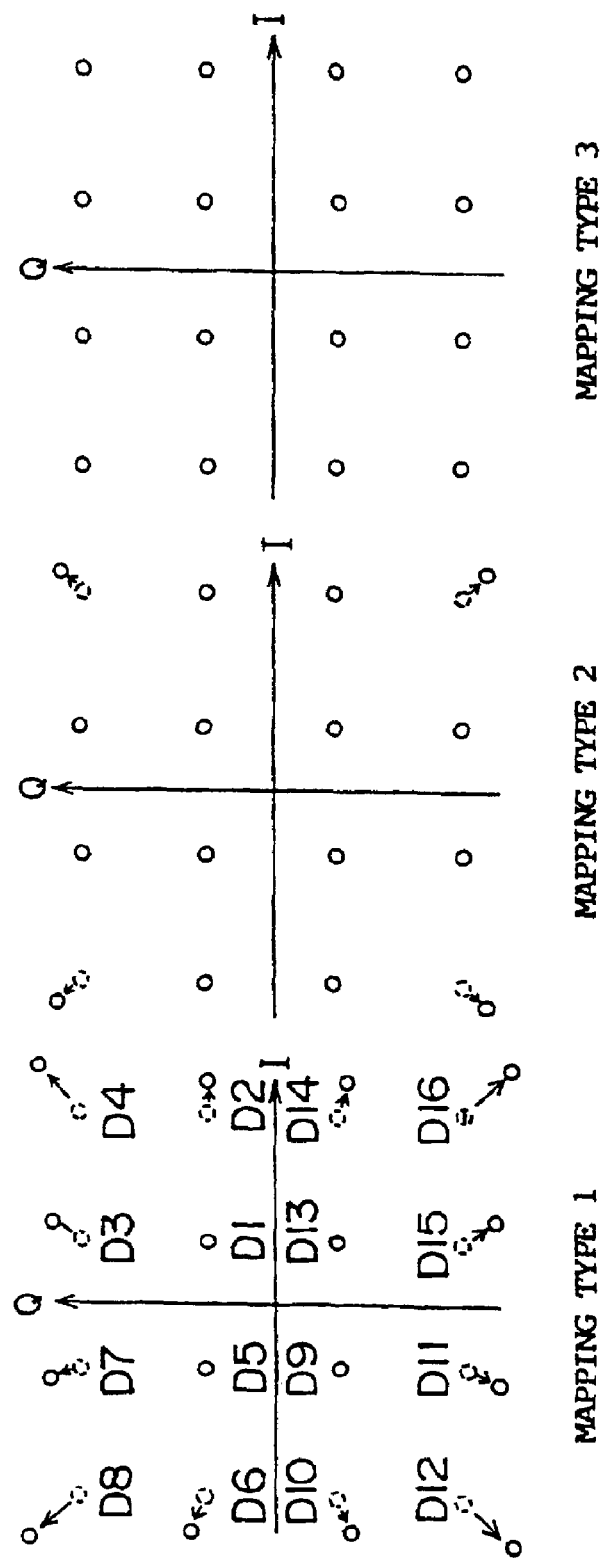
FIG. 26 shows signal space diagrams for explaining the operation principle of the ninth embodiment of the distortion compensating device shown in FIG. 25.

Next, a description will be given of a ninth embodiment of the distortion compensating device according to the present invention, by referring to FIG. 25 and FIG. 26. FIG. 25 shows a configuration of a distortion compensating system including the ninth embodiment of the distortion compensating device according to the present invention. FIG. 26 shows signal space diagrams for explaining the operation principle of the ninth embodiment of the distortion compensating device shown in FIG. 25. The distortion compensating system shown in FIG. 25 comprises a modulator 910, a transmitter 940, a receiver 950, and a demodulator 970.

In the system, the I-channel and Q-channel signals divided from the baseband signal are respectively supplied to a variable mapping circuit 911, and therein, each is mapped to one of 16 specified signal points on the space diagram. Mapped signals are past through digital-to-analog converters 912, 913 and roll-off filters 914, 915, and thereby the carrier is quadrature-modulated in a quadrature modulator 916. A quadrature-modulated signal is supplied to the transmission stage 940 through a filter 917, and is amplified to be transmitted. A transmitted signal is received in the reception stage 950. A received signal is quadrature-demodulated in a quadrature detector 971 of the demodulator 970. A detected signal having I-channel and Q-channel components is transmitted to an equalizer 976 through roll-off filters 972, 973 and analog-to-digital converters 974, 975. The quadrature detector 971 may use a coherent detector. Output signals of the I-channel and Q-channel components of the equalizer 976 are discriminated in the successively connected discrimination circuit which may be the conventional discrimination circuit.

The transmission stage 940 comprises a transmitting amplifier 941 and a mixer 942, and the reception stage 950 comprises a receiving amplifier and a mixer 952. When the signal level is high, the transmission signal is distorted by the nonlinear characteristics of these amplifiers and mixers.

The reception stage 950 further comprises an AGC circuit 953 which can supply the received signal level of the digital signal to the variable mapping circuit of the modulator 910. For supplying the received signal level to the modulator 910, an order-wire signal in a down link is usable.

The variable mapping circuit 911 can select one of various mapping types based on an external signal. For example, three mapping types shown in FIG. 26 may be set to the variable mapping circuit 911. In mapping type one, the positions of the outer side signal points D2, D3, D4, D6, D7, D8, D10, D11, D12, D14, D15, D16 are shifted in the outer direction. This mapping type is effective for obtaining good transmission performance when extremely large distortion occurs due to an extremely large signal level. In mapping type two, the positions of the outer side signal points D4, D8, D12, D16 are shifted. This mapping type is effective for obtaining good transmission performance when relatively large distortion occurs due to a relatively large signal level. Mapping type three indicates the conventional mapping type of the conventional specified signal points.

The variable mapping circuit 911 may be constructed with only a ROM. In the ROM, data for the three mapping types is stored in three areas of the memory, and, thus, these memory areas can be easily selected by an address of 2 bits.

In the following, an operation principle of the distortion-compensating system in FIG. 25 will be described. When the received level signal from the reception stage 950 is represented by a digital signal of 2 bits, the digital signal for the received level can be directly supplied to the variable mapping circuit 911. In the variable mapping circuit 911, when the received level signal from the reception stage 950 indicates an extremely high level, mapping type one is selected; when the received level signal indicates a relatively high level, mapping type two is selected; and, when the received level signal indicates a low level, mapping type three is selected. When the mapping type is changed in the variable mapping circuit 911, an average transmission power is controlled to a constant level in the transmission stage 940. Therefore, even if the average transmission power is increased by the changes of the mapping type, it prevents nonlinear distortion from further increasing.

In this way, when the received signal is strongly distorted by the nonlinear characteristics at the high signal level, since the outer side signal points which are easily distorted have already been shifted in the outer direction, even if these signal points are distorted, the possibility of the fault discrimination generating error bits becomes small. On the other hand, when influence due to noise is stronger than that due to the distortion by the low signal level, since the signal points are uniformly mapped on the space diagram, uniform dispersion of the signal points due to the noise may be properly discriminated. When the received signal level is low, if mapping type one or two is selected, the C/N of the inner side signal point becomes very small compared to that of the outer signal point because the transmission power is maintained at the constant value regardless of the mapping types. For the above reason, when the received signal is low, mapping type three is selected.

Accordingly, in the distortion-compensating system, even if the received signal level in the receiver is high, good transmission performance against the nonlinear distortion of the amplifier may be obtained. Thus, even if the transmission power in the transmitter is increased, it is unnecessary to attenuate the received level as in the conventional system. This enables the system gain to increase.

In the distortion compensating device shown in FIG. 25, the device selecting one of the three mapping types has been described. In fact, other devices selecting one of two or more than three mapping types are also applicable. In the same way as the distortion compensating device shown in FIG. 24, the reference of the received level for selection of the mapping type may be determined based on the back off value of the amplifier. Further, when the received level signal indicating the received level is generated, the analog-to-digital converter is used in the system. However, when there are two mapping types, a comparator is usable instead of the analog-to-digital converter for simplicity of the configuration.

In the above, a plurality of embodiments of the distortion compensating device have been described. When combining some embodiments, the total performance of the transmission performance and the construction performance may be further improved. As described above, these distortion-compensating devices are mounted in the receiver or the transmitter. Therefore, the receiver and the transmitter including the distortion compensating device are also operative as the distortion compensating device according to the present invention, and may have the same features. Accordingly, the receiver and the transmitter including the distortion compensating device falls within the spirit and scope of the present invention.

In the above-mentioned distortion-compensating devices, each device is constructed with discrete circuits such as adders, subtracting circuits, flip-flops, and memories. All of these devices may be easily constructed with a digital signal processor (DSP). In this case, program for the DSP is easily provided based on the above-described operation of the device by those skilled in the art.

Further, in the above-mentioned distortion-compensating devices, the distortion-compensating operation does not need to be performed for all signal points on the space diagram, but may be performed for the signal points on a restricted area. For example, when the signal is distorted due to the nonlinear characteristics of the amplifier, even if the distortion-compensating operation is performed for only the outer side signal points on the space diagram which are easily distorted, effective distortion compensation may be achieved.

Since the distortion compensating device according to the present invention is independent of the characteristics of the amplifier, the device effectively operates for distortion due to other elements such as mixers, local oscillators, and filters.

Furthermore, the distortion compensating device is applicable for various communication such as terrestrial communication, satellite communication, and mobile communication, and for various multi-level linear modulation such as QPSK, 8QAM, 64QAM, and 256QAM.

As described above, the present inventions have the following features.

The distortion compensating device may compensate all of the distortion which is added in the transmission path from the modulator in the transmitter to the demodulator in the receiver since the operation of the device is independent of the characteristics of the transmitting amplifier and the receiving amplifier. Since each device operates at the base-band frequency, the device may be constructed with digital signal processing, and may be integrated into a 1-chip IC.

Further, since some distortion-compensating devices are constructed with a single ROM, the device may be small in size and it becomes easy to fabricate and install the device.

Since the interaction between the I-channel and Q-channel signals is taken into account in the distortion compensating device, superior performance of the distortion compensation is achieved.

When the signal is distorted by the nonlinear characteristics due to the high level of the signal, even if the received signal point in the receiver is deviated by the distortion, the possibility of a fault decision may be decreased. Accordingly, since it is possible to increase transmission power without attenuating the received signal level, this enables the system gain to increase. The above distortion compensating device is constructed with only memory, so that this enables extreme miniaturization of the device.

Further, the present invention is not limited to these embodiments, but other variations and modifications may be made without departing from the scope of the present invention.

What is claimed is:

1. A transmitter comprising:

a modulator supplying a signal; and a transmission stage transmitting the signal to a receiver which provides a level of a received signal;

wherein the modulator comprises variable mapping means for changing a mapping pattern of specified signal points in a signal space diagram according to the level of the received signal received by said receiver.

2. The transmitter as claimed in claim 1, wherein said variable mapping means comprises control means for chang 2. The transmitter as claimed in claim 1, wherein said variable mapping means comprises control means for changing the mapping pattern to a mapping pattern in which at least one of the specified signal points is shifted to an outer side of the signal space diagram when the level of the received signal is higher than a given value.

3. The transmitter as claimed in claim 2, wherein said variable mapping means receives a signal of said level of the received signal received by the receiver via a communication line which is other than a communication line via which said transmission stage transmits the signal to the receiver.

4. A transmitter comprising:

a modulator supplying a signal; and a transmission stage transmitting the signal to a receiver which measures a receiving condition and transmits said receiving condition to said transmitter;

wherein the modulator comprises a variable mapping section changing a mapping pattern of specified signal points in a signal space diagram according to a level of a received signal received by said receiver.

5. The transmitter as claimed in claim 4, wherein said variable mapping section changes the mapping pattern to a mapping pattern in which at least one of the specified signal points is shifted to an outer side of the signal space diagram when the level of the received signal is higher than a given value.

6. The transmitter as claimed in claim 4, wherein the receiving condition is a received level measured by the receiver.

7. A transmitter comprising: a multi-level modulator in which a digital signal is mapped to one of a plurality of specified signal points in a signal space diagram; and p1 a transmission stage transmitting a signal output from said multi-level modulator to a receiver which provides a level of a received signal;

said multi-level modulator comprising:

a variable mapping circuit changing a mapping pattern of the specified signal points in the signal space diagram according to the level of the received signal received by the receiver.

8. The transmitter as claimed in claim 7, wherein said variable mapping circuit changes the mapping pattern to a mapping pattern in which at least one of the specified signal points is shifted to an outer side of the signal space diagram when the level of the received signal is higher than a predetermined value.

9. The transmitter as claimed in claim 8, wherein said variable mapping circuit receives a signal of said level of the received signal received by the receiver via a communication line which is other than a communication line which said transmission stage transmits the signal to the receiver.

* * * * *